(12) United States Patent
Sawada

(10) Patent No.: US 9,516,285 B2
(45) Date of Patent: Dec. 6, 2016

(54) IMAGE PROCESSING DEVICE, IMAGE PROCESSING METHOD, AND IMAGE PROCESSING PROGRAM

(75) Inventor: Yasuhiro Sawada, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 1015 days.

(21) Appl. No.: 12/675,671

(22) PCT Filed: Aug. 25, 2008

(86) PCT No.: PCT/JP2008/065124
§ 371 (c)(1),
(2), (4) Date: Apr. 1, 2010

(87) PCT Pub. No.: WO2009/028468
PCT Pub. Date: Mar. 5, 2009

(65) Prior Publication Data
US 2010/0246994 A1 Sep. 30, 2010

(30) Foreign Application Priority Data
Aug. 31, 2007 (JP) ................. 2007-225214

(51) Int. Cl.
*G06K 9/40* (2006.01)
*H04N 9/04* (2006.01)
*H04N 5/357* (2011.01)

(52) U.S. Cl.
CPC ............ *H04N 9/045* (2013.01); *H04N 5/3572* (2013.01)

(58) Field of Classification Search
None
See application file for complete search history.

(56) References Cited

U.S. PATENT DOCUMENTS

| 2004/0156558 A1* | 8/2004 | Kim ............................. 382/276 |
| 2004/0169724 A1 | 9/2004 | Ekpar |
| 2007/0126892 A1* | 6/2007 | Guan ....................... 348/240.99 |

FOREIGN PATENT DOCUMENTS

| JP | 05-284347 A | 10/1993 |
| JP | 06-197261 | 7/1994 |
| JP | 06-205273 A | 7/1994 |
| JP | 11-149549 A | 6/1999 |
| JP | 2006-270918 A | 10/2006 |

(Continued)

OTHER PUBLICATIONS

International Search Report for PCT/JP2008/065124 dated Sep. 12, 2008.

*Primary Examiner* — Mark Roz
(74) *Attorney, Agent, or Firm* — Leydig, Voit & Mayer, Ltd.

(57) ABSTRACT

An image processing device, an image processing method, and an image processing program by which deformation such as distortion caused by an imaging optical system can be corrected with high precision without increase in memory capacity and processing time. The image processing device comprises a vertex sampling coordinate computing section (30) for computing a sampling position on an input image by a high-order expression so as to cancel out distortion at the position of a predetermined pixel of an output image, a sampling coordinate interpolation computing section (31) for interpolating the sampling position on the input image, at the position of a pixel other than the position of the predetermined pixel of the output image, from a sampling position of a predetermined output pixel located near the pixel, and a sampling unit (32) for sampling a pixel value of the input image at the sampling position computed via the vertex sampling coordinate computing section (30) and the sampling coordinate interpolation computing section (31).

27 Claims, 9 Drawing Sheets

(56) References Cited

FOREIGN PATENT DOCUMENTS

| JP | 2007-292619 A | 11/2007 |
| WO | WO 2006/062508 A1 | 6/2006 |
| WO | WO 2007/083621 A1 | 7/2007 |

* cited by examiner (a)

(b)

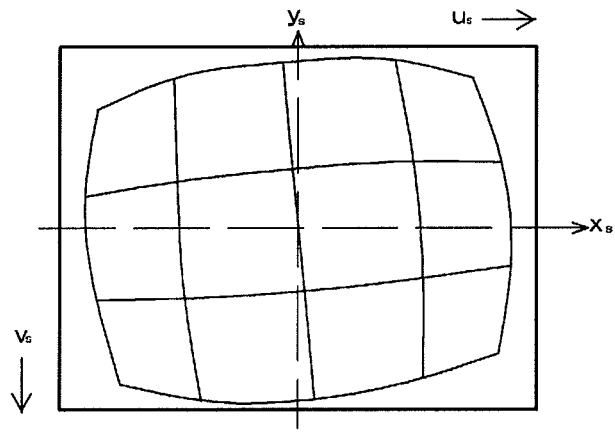
FIG. 4a
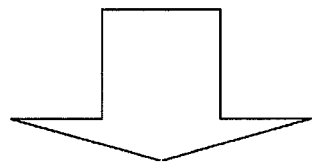
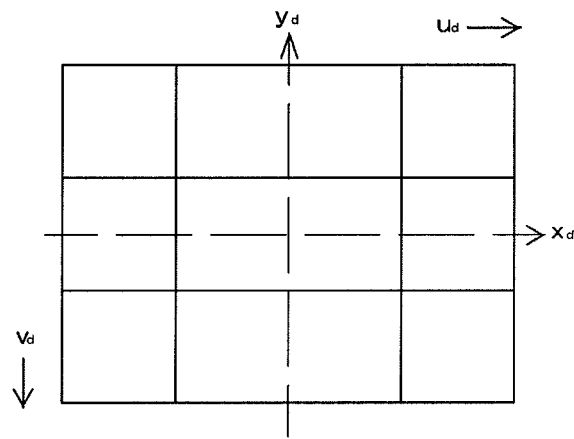
FIG. 4b

| object distance \ focal distance | Wide: 28mm | Mid: 50mm | Tele: 105mm |
|---|---|---|---|
| Near: 0.5m | 0.10 | 0.03 | −0.05 |
| Mid: 1.0m | 0.08 | 0.02 | −0.04 |
| Far: Inf | 0.05 | 0.00 | −0.02 |

IMAGE PROCESSING DEVICE, IMAGE PROCESSING METHOD, AND IMAGE PROCESSING PROGRAM

BACKGROUND OF THE INVENTION

Field of the Invention

The present invention relates to correction of aberration distortions, in particular by image processing, in an image formation optical system, such as a digital camera provided with the electronic imaging optical system.

Background of the Invention

In the imaging system of a digital camera image formation is conventionally carried out by an imaging lens that projects an object image onto an image sensor. The image sensor has a plurality of optoelectric transducers arranged in a matrix form that provide for a photoelectric conversion of the object image projected by the lens. An image processing device using an image processing method then generates an output image using the picture signal provided by the image sensor.

In current digital camera's, the pixel positions of the output image, match with those of the picture obtained from the image sensor (also denoted as input image). Each pixel signal sampled from the input image is converted into a pixel signal for the output image.

A lens of an optical system generally causes a geometric distortion by aberration in a picture obtained therewith. This deteriorates the accuracy and quality of the picture. Various measures are taken to reduce this aberration.

For example, it is known to reduce the distortion by aberration of a lens by combining two or more lenses. However, this increases the costs and negatively influences productivity.

Image signal processing methods are known to control aberration distortion in a digitized picture obtained by image formation using a lens.

For example, the pixel coordinate of a reference picture not having a aberration distortion are compared with the coordinates in the picture obtained from the image projected by the lens on the image sensor. A memory stores for each sampling position in the output image the corresponding coordinates in the reference image. Then, an arbitrary picture is compensated for aberration distortion, by reading the correct sampling coordinates for each sampling position from the memory.

For every pixel of an output image, the sampling position to an input image is converted using a high order polynomial. By sampling the input image in the converted sampling position an aberration distortion should be compensated. Such a method of controlling a aberration distortion is known for example from patent documents 1 and 2.

Patent documents 1: JP 2000-324339 A
Patent documents 2: JP 10-262176 A

SUMMARY OF THE INVENTION

However, in time the number of pixels in picture devices, such as a digital camera, gradually increased to obtain larger images with a higher resolution. Accordingly it is a problem that storing the correction value for the sampling position in the input image in a memory for each pixel of the output image, requires a large memory capacity for storing the correction values and is unfavorable for the efficiency.

Accordingly, the method of matching all pixels of an output image by computing the sampling position of an input image using a high order polynomial, as disclosed in patent documents 1 and 2, results in a high computational load of high order calculations having the problem of a long processing time.

Moreover, in a digital camera provided with a zoom function by movement of a lens the aberration distortion changes with the position of the lens. Accordingly the high order polynomial used to calculate the correction value for correcting an aberration distortion to all the pixels should change according to the position or zoom condition of the lens. This requires a further increase of memory space or processing time, and also entails the problem of an increased power consumption.

Accordingly, it is an object of this invention to provide an image processing device, an image processing method, and an image processing program which enable a correction of the aberration distortion resulting from an image formation optical system, etc. with high precision without increasing memory space and processing time in view of the above problem.

In order to achieve this purpose an image processing device according to a first aspect of the invention is provided which generates an output image with reduced distortion from an input image inputted with a distortion by aberration obtained from an image formation optical system, the device comprising a high order operation section which computes a sampling position in said input image by a high order polynomial from predetermined pixel positions in said output image for compensation of aberration distortion, an interpolating calculation section for carrying out interpolation calculation of the sampling position in said input image in pixel positions other than said predetermined pixel position in said output image from sampling positions of said predetermined output pixels located near this pixel.

a sampling unit which samples a pixel value of said input image in a sampling position computed via said high order operation section and said interpolating calculation section.

In the image processing device according to claim 1 sampling position in an input image are computed for predetermined pixel positions in the output image by a high order polynomial. For pixel positions other than the predetermined pixel positions a sampling position in the input image is calculated by interpolation from sampling positions of predetermined output pixels located near those other pixel positions. Since the sampling unit samples a pixel value of said input image taking into account the transformed position, aberration distortion resulting from an image formation optical system can be compensated with high precision. As high order calculations are only carried out for a subset of the pixel positions in the output image this is possible without increasing memory space and processing time.

In the image processing device according to claim 2, the interpolating calculation section is arranged to calculate said sampling position with bilinear interpolation. Therewith, in pixel positions other than a predetermined pixel position in an output image, a sampling position is easily computable. Hence, processing time is short and power consumption is reduced as it is not necessary to compute a sampling position of an input image by a high order polynomial to the pixel position of all output pixels.

In the image processing device according to claim 3, said interpolating calculation section is arranged to calculate said sampling position with sufficient accuracy by cubic interpolation in pixel positions other than a predetermined pixel position in an output image.

The image processing device according to claim 4 has a non-zero number of said predetermined output pixels that is smaller than the number of all pixels of said output image. Since therewith the number of sampling positions to be computed by a high order polynomial is less than the number of all the pixels of the output picture, the amount of high order polynomial operations is reduced.

In the image processing device according to claim 5 local distortions are prevented so that a smooth output image can be obtained.

In the image processing device of a statement according to claim 6, said image formation optical system comprises a lens for projecting the object image to an image sensor. By relating said high order polynomial or its coefficient with said image formation optical system which accompanies said image sensor, a aberration distortion of an image formation optical system can be compensated, and a predetermined output image with sufficient accuracy can be obtained.

The image processing device according to claim 7, is arranged to adapt said high order polynomial or its coefficients to a change in state of the image formation optical system which accompanies said image sensor. Therewith said high order polynomial or its coefficient adapted, so that the image processing device is capable of compensating a aberration distortion with sufficient accuracy also in case of a change of a aberration distortion by change of state of the image formation optical system.

The image processing device according to claim 8 has a high order polynomial modification facility that changes said high order polynomial or its coefficients in response to a position of said lens on an optic axis, said optical axis extending in a direction from said photographic subject to said image sensor. By having a high order polynomial modification facility that changes said high order polynomial or its coefficient, a change of a aberration distortion by change of a position of a lens is compensated, and a aberration distortion can be compensated with sufficient accuracy.

By having a memory measure which memorizes a coefficient of said high order polynomial in the image processing device according to claim 9, an operator does not need to provide a high order polynomial to the image processing device for every image processing, which facilitates operation of the image processing device.

The image processing device according to claim 10, stores coefficients of said high order polynomial that match with a prescribed positions of said lens in said memory facility. For those positions other than said prescribed position of said lens the coefficient interpolation facility generates a coefficient of said high order polynomial by interpolation from coefficients of said high order polynomial stored in said memory facility. Therewith suitable coefficients of the high order polynomial can be obtained for the entire zone of movement of the lens while the required memory capacity can be reduced.

According to a second aspect of the invention, as claimed in claim 11, an image processing method is provided which generates an output image with reduced distortion from an input image with a aberration distortion obtained from an image formation optical system. The image processing method comprises a a high order arithmetic step which computes a sampling position on said input image for a predetermined pixel position by a high order polynomial for compensation of aberration distortion. In pixel positions other than said predetermined pixel positions in said output image, an interpolating calculation step carries out interpolation calculation of the sampling position on said input image from a sampling position of said predetermined output pixels in located near this pixel. Next a sampling step samples a pixel value of said input image in a sampling position computed via said high order arithmetic step and said interpolating calculation step.

In the method of the invention according to claim 11 sampling positions in an input image are computed from predetermined pixel position in an output image by a high order polynomial for compensation of aberration distortion may be compensated. In other pixel positions a sampling position is computed via an interpolating calculation step which carries out interpolation calculation of the sampling position on an input image, from sampling position corresponding to predetermined output pixels near the pixel. Since a sampling step which samples a pixel value of an input image is used, distortion of a aberration distortion resulting from an image formation optical system, etc. can be compensated with high precision as is described with reference to claim 1 above, without increasing memory space and processing time.

In the image processing method according to claim 12 said interpolating calculation step comprises bilinear interpolation. By computing said sampling position with bilinear interpolation in pixel positions other than a predetermined pixel position the sampling position is easily computable with short processing times and a low power consumption as compared to a method wherein a sampling position of an input image is computed by a high order polynomial for all output pixels.

In the image processing method according to claim 13 said interpolating calculation step comprises cubic interpolation. By computing said sampling position by cubic interpolation, a sampling position is computable with sufficient accuracy in pixel positions other than said predetermined pixel positions in an output image.

In the image processing method according to claim 14 of a statement the number of said predetermined output pixels is a non-zero number that is smaller than the number of all pixels of said output image. Since therewith the number of sampling positions to be computed by a high order polynomial is less than the number of all the pixels of the output picture the amount of high order polynomial operations is reduced.

In the image processing method according to claim 15, wherein said high order polynomial comprises a term of at least the third order local distortions are prevented, therewith enabling a smooth output image.

In the image processing device according to 16 said image formation optical system comprises a lens that projects the object image to an image sensor, and in that said high order polynomial or its coefficient is related with said image formation optical system which accompanies said image sensor. By relating said high order polynomial or its coefficient with said image formation optical system which accompanies said image sensor, a aberration distortion of an image formation optical system can be compensated, and a predetermined output image with sufficient accuracy can be obtained.

In the image processing method according to claim 17 said high order polynomial or its coefficients is adaptable to a change in state of an image formation optical system which accompanies said image sensor. Therewith said high order polynomial or its coefficient is adapted so that the method is capable of compensating a aberration distortion with sufficient accuracy also in case of a change of a aberration distortion by a change of state of the image formation optical system.

In the image processing method according to claim 18 said high order polynomial or its coefficients are adapted in response to a position of said lens on an optic axis. By adapting said high order polynomial or its coefficients, a change of a aberration distortion by change of a position of a lens is compensated, and a aberration distortion can be compensated with sufficient accuracy.

In the image processing method according to claim 19, having a memory measure which memorizes a coefficient of said high order polynomial in the image processing device according to claim 9, an operator does not need to provide a high order polynomial to the image processing device for every image processing, which facilitates operation of the image processing device.

The image processing method according to claim 20, memorizes coefficients of said high order polynomial corresponding to prescribed positions of said lens and in positions other than a prescribed position of said lens applies a coefficient interpolation generation step which generates a coefficients of said high order polynomial by interpolation from a coefficient of said high order polynomial memorized by said memory measure, Therewith suitable coefficients of the high order polynomial can be obtained for the entire zone of movement of the lens while the required memory capacity can be reduced.

According to a third aspect of the invention as claimed in claim 21 an image processing program is provided for generating an output image with reduced distortion from an input image with a aberration distortion obtained from an image formation optical system. The image processing program causes a computer to perform the following steps:

a high order arithmetic step which computes a sampling position on said input image by a high order polynomial in predetermined pixel positions in said output image for compensation of aberration distortion, an interpolating calculation step which carries out interpolation calculation of the sampling position on said input image in pixel positions other than said predetermined pixel positions in said output image from a sampling position of predetermined output pixels near this pixel, a sampling step which samples a pixel value of said input image in a sampling position computed by said high order arithmetic step and said interpolating calculation step.

In the image processing program according to claim 21 sampling positions in an input image are computed from predetermined pixel position in an output image by a high order polynomial for compensation of aberration distortion may be compensated. In other pixel positions a sampling position is computed via an interpolating calculation step which carries out interpolation calculation of the sampling position on an input image, from sampling position corresponding to predetermined output pixels near the pixel. Since a sampling step which samples a pixel value of an input image is used, distortion of a aberration distortion resulting from an image formation optical system, etc. can be compensated with high precision as is described with reference to claim 1 above, without increasing memory space and processing time.

In the image processing program according to claim 22, said sampling position is computed in said interpolating calculation step with bilinear interpolation. By computing said sampling position with bilinear interpolation in pixel positions other than a predetermined pixel position the sampling position is easily computable with short processing times and a low power consumption as compared to a method wherein a sampling position of an input image is computed by a high order polynomial for all output pixels.

In the image processing program according to claim 22, said sampling position is computed in said interpolating calculation step with cubic interpolation. By computing said sampling position by cubic interpolation, a sampling position is computable with sufficient accuracy in pixel positions other than said predetermined pixel positions in an output image.

In the image processing program according to claim 24, the number of said predetermined output pixels is a non-zero number that is smaller than the number of all pixels of said output image. Since therewith the number of sampling positions to be computed by a high order polynomial is less than the number of all the pixels of the output picture the amount of high order polynomial operations is reduced.

In the image processing program according to claim 25, said high order polynomial comprises a term of at least the third order. Therewith local distortions are prevented, enabling a smooth output image.

In the image processing program according to claim 26 said image formation optical system comprises a lens that projects the object image to an image sensor, and in that said high order polynomial or its coefficient is related with said image formation optical system which accompanies said image sensor. By relating said high order polynomial or its coefficient with said image formation optical system which accompanies said image sensor, a aberration distortion of an image formation optical system can be compensated, and a predetermined output image with sufficient accuracy can be obtained.

In the image processing program according to claim 27 said high order polynomial or its coefficients is adaptable to a change in state of an image formation optical system which accompanies said image sensor. Therewith said high order polynomial or its coefficient is adapted so that the computer is capable of compensating a aberration distortion with sufficient accuracy also in case of a change of a aberration distortion by a change of state of the image formation optical system.

In the image processing program according to claim 28, said high order polynomial or its coefficients are adapted in response to a position of said lens on an optic axis. By adapting said high order polynomial or its coefficients, a change of a aberration distortion by change of a position of a lens is compensated, and a aberration distortion can be compensated with sufficient accuracy.

In the image processing program according to claim 29 a coefficient of said high order polynomial is memorized using a memory facility. By storing coefficients of said high order polynomial an operator does not need to provide a high order polynomial to the image processing device for every image processing session, which facilitates operation of the image processing device.

In the image processing program according to claim 30 to be performed on a computer coefficients of said high order polynomial matching with a prescribed position of said lens are memorized to said memory measure, while in positions other than said prescribed positions of said lens, a coefficient interpolation generation step is applied which generates a coefficient of said high order polynomial by interpolation from a coefficient of said high order polynomial memorized in said memory facility. Therewith suitable coefficients of the high order polynomial can be obtained for the entire zone of movement of the lens while the required memory capacity can be reduced.

EFFECT OF THE INVENTION

In the image processing device the image processing method, and and the image processing program according to the present invention it is determined for predetermined pixel positions in an output image, how a aberration distortion can be compensated. In pixel positions in the output image other than the predetermined pixel position a high order polynomial is used to calculate the sampling position in the input image. The sampling position in the input image is computed by an interpolating calculation from the sampling positions corresponding to those predetermined output pixels located near this pixel. By sampling the pixel value of said input image in this way, distortion of the aberration distortion resulting from an image formation optical system, etc. can be compensated with high precision, without increasing memory space and processing time.

In the embodiment of the image processing device, the image processing method, and the image processing program of the invention wherein the sampling position is computed with bilinear interpolation as the interpolating calculation, the sampling positions corresponding to pixel positions other than the predetermined pixel positions in the output image, are relatively easily computable. This enables a faster processing time and a lower power consumption than would be the case if the sampling position were calculated by a high order polynomial for all output pixels.

In the embodiment of the image processing device, the image processing method, and the image processing program wherein the sampling position is computed by cubic interpolation (also denoted as third order interpolation) as the interpolating calculation for those pixel positions other than the predetermined pixel position in an output image, a sampling position is computable with sufficient accuracy. A smooth output image with a modest local distortion is obtained.

In the embodiment of the image processing device, the image processing method, and the image processing program wherein the number of said predetermined output pixels is a non-zero number that is smaller than the number of all pixels of said output image. Since therewith the number of sampling positions to be computed by a high order polynomial is less than the number of all the pixels of the output picture, the amount of high order polynomial operations is reduced.

In the embodiment of the image processing device, the image processing method, and the image processing program wherein said image formation optical system comprises a lens that projects the object image to an image sensor, and in that said high order polynomial or its coefficient is related with said image formation optical system which accompanies said image sensor it is achieved that a aberration distortion of an image formation optical system can be compensated, and a predetermined output image with sufficient accuracy can be obtained.

In the embodiment of the image processing device, the image processing method, and the image processing program described above said high order polynomial or its coefficients is adaptable to a change in state of an image formation optical system which accompanies said image sensor. Therewith said high order polynomial or its coefficient adapted, so that the image processing device is capable of compensating a aberration distortion with sufficient accuracy also in case of a change of a aberration distortion by change of state of the image formation optical system.

By memorizing said high order polynomial, an operator does not need to input a high order polynomial into an image processing device for every image processing task, therewith facilitating operation. Since the coefficient of a high order polynomial can be generated by interpolation from the memorized coefficients of the high order polynomial that correspond with the predetermined positions of said lens, was memorized, the coefficients of a high order polynomial can be obtained, that are applicable for the entire range of the lens, and the capacity of a memory can be modest.

BRIEF DESCRIPTION OF THE DRAWINGS

FIG. 2a shows an example of block division of the output image, FIG. 4 illustrates the concept of compensation of a distortion by aberration in the first embodiment, wherein (a) shows an output from an imaging optical system which includes a aberration distortion, and (b) shows the output image corrected for distortion by aberration.

TABLE OF PARTS 1, 1A—An imaging device
2, 2A—An imaging optical system
3—An imaging lens
5—Image sensor
5a—The light filter of a Bayer array
6—AFE (Analog Front End)
7—A correlation double sampling circuit
8—Variable gain amplifier (AGC: Automatic Gain Control)
9—An A/D converter
10—A primary detecting element (detecting unit)
11—A sensor
12—Lens actuator (lens driving unit)
13—TG (Timing Generator)
15—Angular velocity sensor
18—CPU (Central Processing Unit)

19—ROM (Read Only Memory)
21—Color plane decomposition unit
22—R field memory
23—G field memory
23a—Gr field memory
23b—Gb field memory
24—B field memory
25—output image block scanning unit
25A—output image scanning unit,
26—A block dividing section,
27—Vertex-coordinates generating section,
27A—Vertex-coordinates generating section,
28—Pixel scanning section
29, 29A—Sampling-coordinates generating unit
30—vertex sampling-coordinates computation section
30B,—vertex sampling-coordinates memory table
31, 31A—Sampling coordinates interpolation section
32—sampling unit
33—color generation unit
34—vision correction unit
35—compression unit,
36—recording unit
37—lens state detecting element
38—aberration coefficient memory table
39—An aberration coefficient generating unit
40—The blur detecting element
100,100A—Image processing device

DETAILED DESCRIPTION OF EMBODIMENTS

Figure 1:
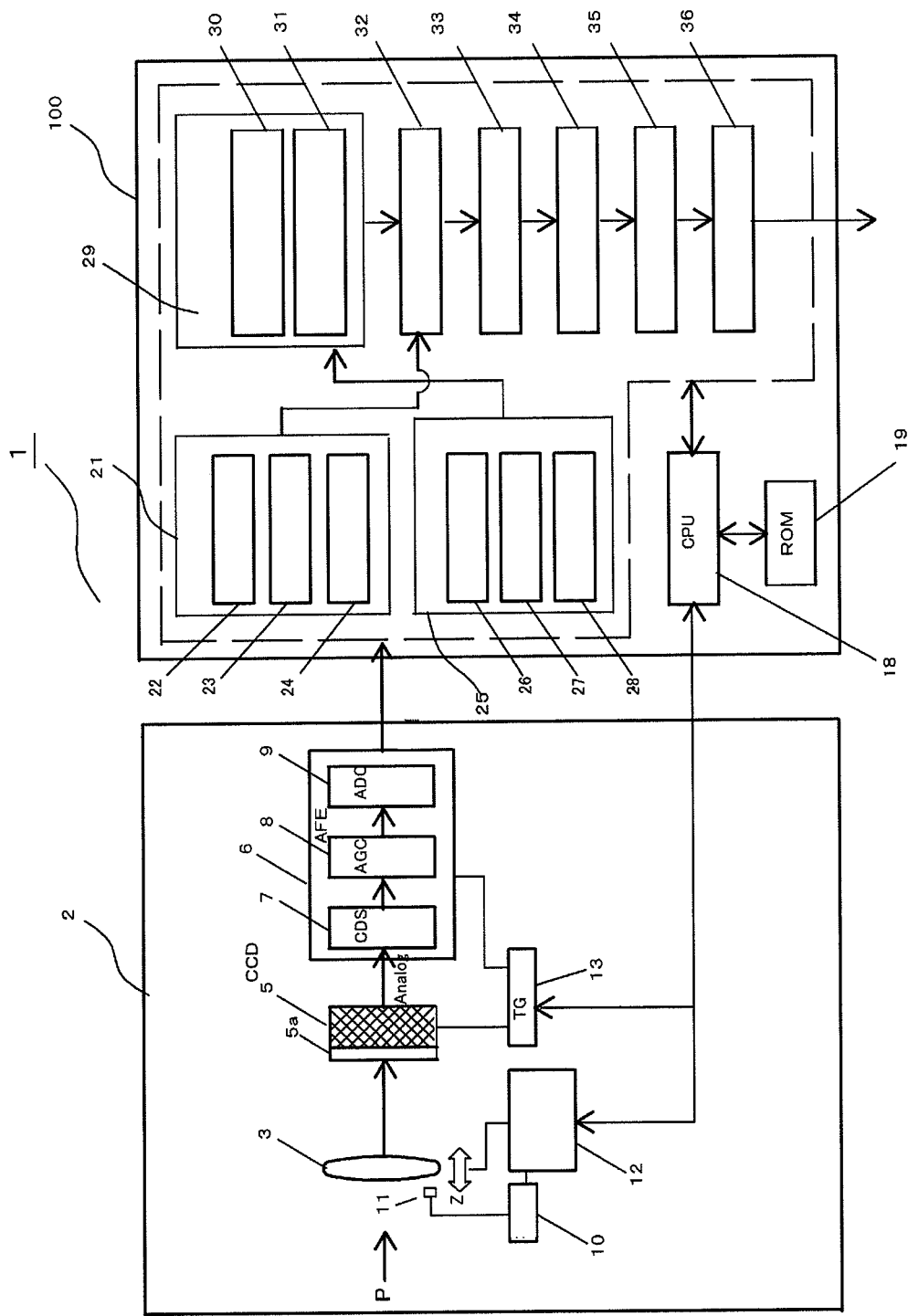
FIG. 1 is a block diagram showing a composition of the imaging device in a first embodiment of the present invention.
Figure 2A:
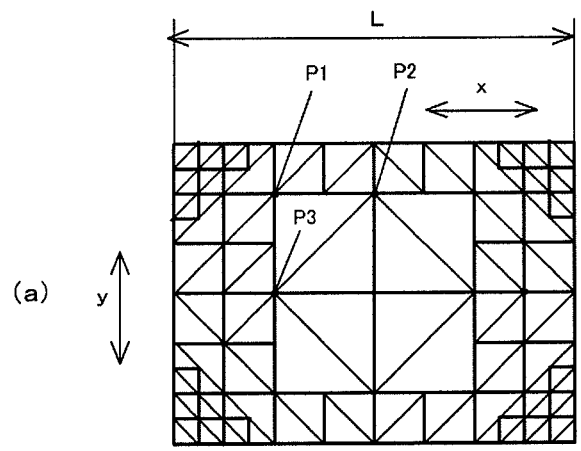
FIG. 2(a) is an explanatory view of a starting point coordinate set.
Figure 2B:
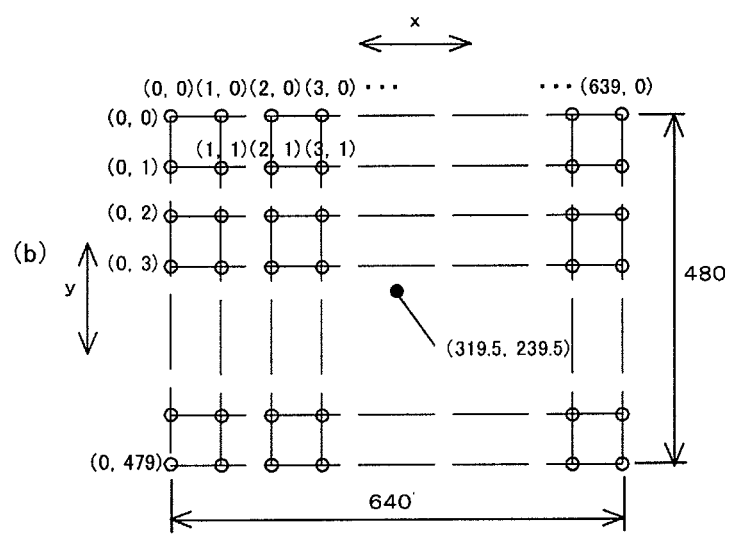
FIG. 2(b) shows the output image of the first embodiment.

Next, a first embodiment of the image processing device of this invention and an image processing method, as well as an image processing program are described with reference to the drawings FIG. 1 is a block diagram showing the composition of the imaging device 1 of one example to which the image processing device of this invention and the image processing method, and the image processing program may be applied. FIG. 2(a) is an explanatory view of a starting point coordinate set. FIG. 2a shows an example of block division of the output image, and FIG. 2(b) shows the output image of the first embodiment.

FIG. 3 illustrates a function of the color plane decomposition unit and a color generation unit in the first embodiment. FIG. 3a shows the color mosaic image of a Bayer array outputted by the imaging optical system 2. FIGS. 3b, 3c and 3d respectively show the R plane, G plane, and B plane arrangement generated by the color plane decomposition and Figure (e) illustrates an interpolation calculation of the pixel value in sampling coordinates.

Figure 5:
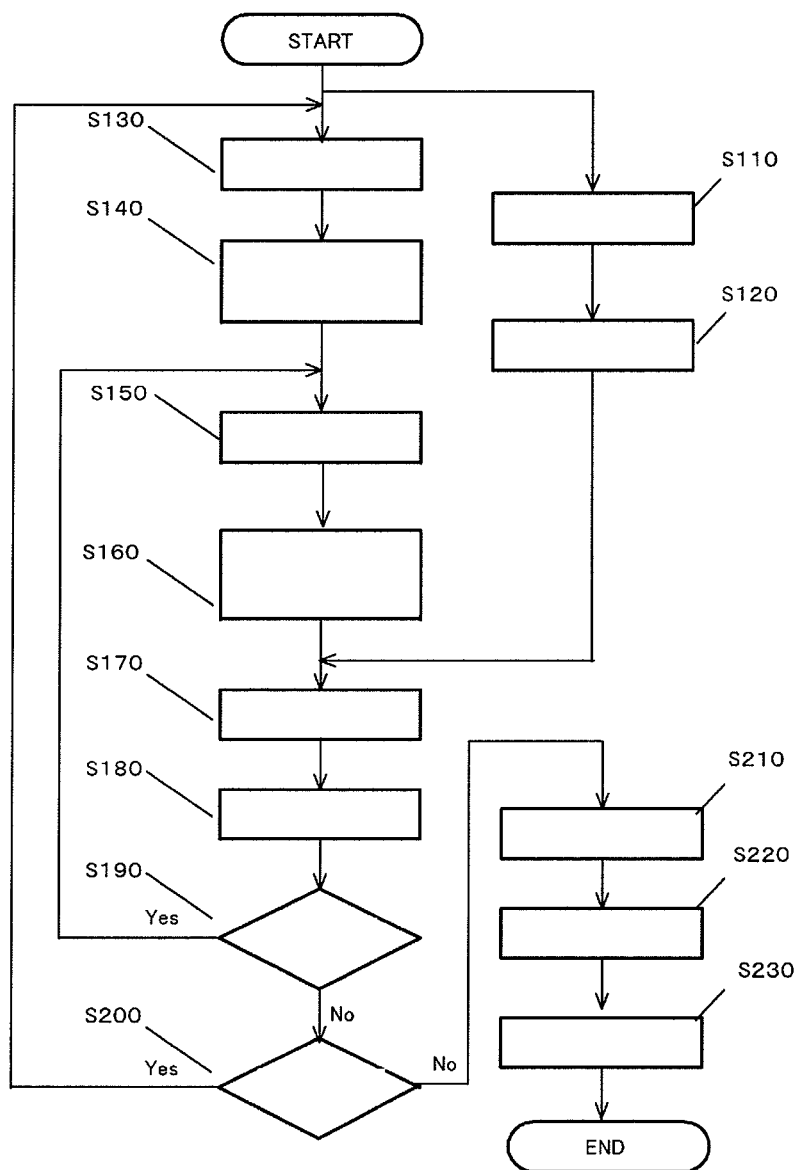
FIG. 5 shows a procedure for an image processing program in the first embodiment.

FIG. 4 illustrates the concept of correction for a distortion caused by aberration in this embodiment. Therein FIG. 4(a) shows an output of an imaging optical system including a distortion caused by aberration, and FIG. 4(b) shows an output image obtained by correction for the distortion. FIG. 5 shows an image processing procedure in an image processing program according to the present invention.

As shown in FIG. 1, the imaging optical system 2 of the imaging device 1 projects an object image to the image sensor 5, and outputs a digital image signal C (being a mosaic image signal). Based on digital image signal C outputted by the imaging optical system 2, the image processing device corrects for the distortion caused by aberration depending on an imaging optical system and generates the color picture provided with a plurality of color information for every pixel.

In the imaging optical system 2 the imaging lens 3 projects the object image P to the image sensor 5, which represents the light it receives as a quantity of electricity. The analog picture signal outputted by the image sensor (e.g. a CCD: Charge Coupled Devices) is converted into a digital image signal C by and analog front end (AFE) 6. A TG (Timing Generator) 13 controls the AFE (Analog Front End) 6 and the image sensor 5, by a predetermined cycle. The lens actuator 12 drives a slide for positioning the imaging lens 3 along the optical axis direction (Z direction). It is coupled to primary detecting element 10 which detects the slide amount of the imaging lens 3 using a sensor 11. The function of the image sensor 5 is now described in more detail below.

The image sensor 5 comprises a plurality of optoelectric transducers that are laterally arranged with respect to each other in a matrix form. The optoelectric transducers each provide for a photoelectric conversion of the imaging signal and output an analog picture signal.

The image sensor 5 is provided with the light filter 5a formed by a Bayer (Bayer) arrangement of G (green), B (blue) and R (red) colored elements that each match with an optoelectric transducer that converts the light filtered by the respective colored element into an electrical signal.

The outputted analog picture signal obtained from the image sensor 5 is further processed by analog front end (AFE) 6. The analog front end 6 comprises a variable gain amplifier (AGC) 8 which amplifies the picture signal obtained from coorelation double sampling unit (CDS) 7. The latter unit carries out correlation double sampling to remove noise. The analog front end further comprises an A/D converter 9 etc. which changes the analog picture signal obtained from the image sensor 5 via the variable gain amplifier 9 into a digital image signal, Accordingly, the picture signal outputted from the image sensor 5 is changed into digital image signal C of a predetermined sampling frequency, and is outputted to the image processing device 100.

Moreover, in the imaging optical system 2, in addition to image sensor 5, the correlation double sampling circuit 7, the variable gain amplifier 8, and A/D-converter 9, and a CMOS (Complementary MetalOxide Semiconductor) sensor may be used. As the pixel signal output from the image sensor 5 has only the single color information of each pixel, the above-mentioned mosaic image signal is outputted to the image processing device 100 by the imaging optical system 2.

Generally svertexing, aberrations peculiar to the imaging lens 3 distort the object image that is projected to the image sensor 5. The image processing device 100 is constituted to corrects distortion of an input image so that the output image is free from distortions.

Next the image processing device 100 for processing the mosaic image outputted from the imaging optical system 2 is described in more detail. The sampling-coordinates generating unit 29 generates sampling coordinates for every pixel of R, G and B, based on the signal obtained from the block scanning unit 25. Based on the sampling coordinates generated by the sampling-coordinates generating unit 29, the sampling unit 32 samples the pixel value R, G, B at the output of the color plane decomposition unit 21 that are separated for every pixel. The image processing device comprises a color generation unit 33 which generates the color data including the pixel value for every pixel of R, G, and B obtained via the sampling unit 32 which, and was provided with a plurality of color components for every pixel.

The image processing device 100 further comprises a vision correction unit 34 for applying gamma correction and saturation correction and edge enhancement operations known as such for improving an appearance of a color image obtained as a color picture signal from the color generation unit 33. The color picture outputted via the vision correction unit 34 is provided to the compression unit 35 that compresses the picture data is by methods such as JPEG for storage by the recording unit 36 on a recording medium, such as a flash memory. The data stored by the recording unit 36 is the output color picture. A CPU (Central Processing Unit) 18 controls processing of the imaging device 1 concerned and in particular the image processing device 100 according to a program for control stored in ROM 19.

The R field memory 22 which is matched with a Bayer array memorizes the pixel signal R obtained in the color plane decomposition unit 21 as shown in FIG. 1 and FIG. 3, Likewise, the G field memory 23 memorizes the pixel signal of G, and the B field memory 24 memorizes the pixel signal of B, and these pixel signals (henceforth also denoted as a pixel value) are outputted to the sampling unit 32 based on the instructions from CPU 18.

The image processing device 100 comprises a block scanning unit 25. It has a block dividing section 26 that divides the output color image into a plurality of blocks. The block scanning unit further comprises a vertex-coordinates generation section 27 that generates the vertex coordinates of the block formed by the block dividing section 26. A block is scanned by the pixel scanning section 28 which searches for the coordinates, and the pixel coordinate searched computed by the vertex-coordinates generation section 27 is provided to the sampling-coordinates generation unit 29.

The size of an output color image, block division shape, a pixel position, etc. are beforehand set up by the user, and are controlled by parameters stored in ROM 19.

The block dividing section 26, seamlessly divides an image range into triangular blocks as shown in FIG. 2(a). Generally speaking, if the block size is reduced, distortion correction accuracy improves, but the computational load increases. On the other hand, if the block size is enlarged, the computation load for compensating the distortion decreases, but the accuracy of the compensation deteriorates.

According to the research carried out by the inventor, in order to obtain good correction results, a length of one side of the smallest block is preferably 1/10 of the image width (L) or less, and it is preferred that the block size decreases in a direction from the center of a picture towards the four corners, as in that direction, a distortion by aberration increases. However, since the amount of operations required will increase with the block count the blocks should not be superfluously small. Accordingly in a preferred embodiment the block count is less or equal than 1000.

Next, the vertex-coordinates operation section 27 computes the coordinates $(u_{dn}, v_{dn})$ of three vertices (for example, P1, P2, P3) in a triangular output color image. The sampling coordinates $(u_{sn}, v_{sn})$ on the color mosaic image corresponding to vertex coordinates are computed as follows so that the influence of a distortion by aberration may be compensated.

First, referring to FIGS. 4(a) and 4(b), the coordinate system matched with the pixel position is expressed with uv system, and a coordinate system used for compensation calculations is expressed with xy. Subscript s shows the coordinates in the color mosaic image, and subscript d shows the output color coordinates.

Next, referring to FIG. 2(b), as a coordinate system of an output color image, the greatest image height is set to 1, a screen longitudinal direction is set to x by defining an image center as the origin, and a screen sliding direction is set to y. By way of example in a color picture, 480 pixels are arranged in 640 columns in the longitudinal direction, at equal intervals in the sliding direction.

In uv system coordinates the upper left pixel has coordinate (0,0). The coordinates (u,v) of the pixel at the right hand side thereof are respectively (1, 0), . . . (2, 0) (639, 0). The following line is assigned the coordinates in a rightward direction with (0, 1), (1, 1), and son. Let pixel coordinate (319.5,239.5) be the coordinates of the origin of the xy system Next, the diagonal length from the origin in uv system coordinates is expressed with $F_d$, as follows:

$$F_d = \frac{1}{2}\sqrt{(640^2 + 480^2)}, \text{ this results in } F_d = 400.$$

Therewith $F_d$ becomes the maximum image height of xy system coordinates.

Next, the diagonal length $F_d$ of the uv coordinate system is used by the front formula as a parameter corresponding to the maximum image height 1 of xy coordinate system to calculate xy system coordinates $(x_{dn}, y_{dn})$ corresponding to uv system coordinates $(u_{dn}, v_{dn})$ by the following relations $$x_{dn}=(u_{dn}-319.5)/400$$

$$y_{dn}=(v_{dn}-239.5)/400.$$

Next, a coordinate conversion for aberration distortion compensation is applied to xy system coordinates $(x_{dn}, y_{dn})$.

More in detail, the coordinates after aberration distortion compensation denoted as $(x_{sn}, y_{sn})$, are computed by the high order polynomials $$x_{sn}=x_{dn}(1+k_1 r^2+k_2 r^4), \text{ and}$$

$$y_{sn}=y_{dn}(1+k_1 r^2+k_2 r^4).$$

$r^2$ is computed by the relation $r^2 \equiv x_{dn}^2+y_{dn}^2$. Therein $k_1$ and $k_2$ are coefficients dependent on the aberration distortion in the imaging optical system. Therein $k_1$ corresponds to the third aberration coefficient and $k_2$ corresponds to the 5th aberration coefficient. The high order operations are carried out by the vertex-coordinates operation section 27.

In an embodiment the color mosaic image comprises a pixel arrangement of 1600×1200 regularly arranged pixels. When pixel coordinate (799.5,599.5) is defined as the origin in color output picture $(u_s, v_s)$ then the diagonal length of the color mosaic image is expressed with $$F_s = \frac{1}{2}\sqrt{(1600^2 + 1200^2)}, \text{ resulting in } F_s = 1000.$$

The vertex sampling coordinates $(u_{sn}, v_{sn})$ on the color mosaic image (input image) corresponding to $(x_{sn}, y_{sn})$ are now calculated as follows. With the maximum image height of xy coordinate system, defined by diagonal length $F_s$ the vertex sampling coordinates can now be calculated by $u_{sn}=1000*x_{sn}+799.5$ and $v_{sn}=1000*y_{sn}+599.5$.

The value of the vertex sampling coordinates searched for by the front formula generally is non-integer. It is not necessary to compute vertex sampling coordinates for each block as adoining blocks share vertex sampling coordinates.

The predetermined pixel position in the present application is equivalent to the vertex ($u_{dn}$, $v_{dn}$), and the sampling position ($u_{sn}$, $v_{sn}$) in the predetermined pixel position of the present application is equivalent to vertex sampling coordinates.

Next, the pixel scanning section 28 provides the sampling-coordinates interpolation computing section 31 with the coordinates ($u_d$, $v_d$) of each scanned pixel located in a block in an output color image, by scanning the inside of the block. In the present embodiment, pixels on the vertex and the block border line are considered as part of the blocks. The interpolating calculation section is carried out by the sampling-coordinates interpolation section 31.

Next, the sampling-coordinates interpolating calculation section 31 calculates the sampling coordinates of each pixel except those coinciding with the block vertex. The sampling coordinates ($u_s$, $v_s$) in the color mosaic image (input image) corresponding to the coordinates ($u_d$, $v_d$) of each pixel to be processed are calculated by interpolation from the three vertex sampling coordinates ($u_{sn}$, $v_{sn}$) surrounding the pixel to be processed.

In detail the coordinates of the three vertices surrounding the pixel ($u_d$, $v_d$) to be processed are denoted as ($u_{d1}$, $v_{d1}$), ($u_{d2}$, $v_{d2}$), and ($u_{d3}$, $v_{d3}$) The vertex sampling coordinates corresponding to these vertexes are ($u_{s1}$, $v_{s1}$), ($u_{s2}$, $v_{s2}$), and ($u_{s3}$, $v_{s3}$). The pixel coordinates can be expressed as a function of the vertex sampling coordinates by the relations $u_d = w_1 u_{d1} + w_2 u_{d2} + w_3 u_{d3}$ and $v_d = w_1 v_{d1} + w_2 v_{d2} + w_3 v_{d3}$. Therein $w_1 + w_2 + w_3 = 1$.

Next, the sampling coordinates ($u_s$, $v_s$) of the pixel are computed using the formulas $u_s = w_1 u_{s1} + w_2 u_{s2} + w_3 u_{s3}$ and $v_s = w_1 v_{s1} + w_2 v_{s2} + w_3 v_{s3}$. The sampling coordinates of the input image corresponding to the pixel within the so-called block of the output image are determined using bilinear interpolation.

Next, as illustrated in FIG. 3, the sampling unit 32 generates a sampling value for each color plane generated by the color plane decomposition unit 21. The sampling value is a pixel value for the color in the color plane in the sampling coordinates ($u_s$, $v_s$) computed by the sampling-coordinates generating unit 29.

Under the present circumstances, ($u_s$, $v_s$) is not necessarily an integer, i.e. the sampled coordinate does not necessarily coincide with one pixel. If the sampled coordinate does not coincide with a particular pixel a linear interpolation is carried out for four neighbouring pixels in the same color plane, having a pixel value of the same color. Bilinear interpolation is preferred.

As shown in FIG. 3, the R plane and the B plane each have four neighbour pixels surrounding a lattice point. Accordingly four pixels of the same color surround the sampling coordinates 301 and 303 (101.0,101.4 respectively. The four surrounding pixels are arranged at a square having sides with a length 2.

If sampling coordinates ($u_s$, $v_s$) are (101.0,101.4) as expressed to FIG. 3, the coordinates (u, v) of the four neighbouring pixels having the same color value surrounding this will have coordinates (100,100), (100,102), (102,100), and (102,102).

Figure 3A:
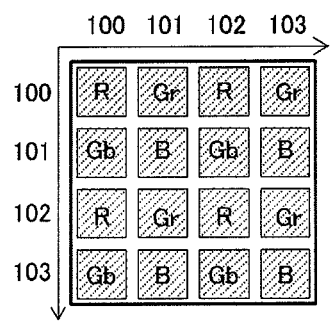
FIG. 3a shows the color mosaic image of a Bayer array outputted by the imaging optical system 2, FIGS. 3b, 3c and 3d respectively show the R plane, G plane, and B plane arrangement generated by the color plane decomposition and Figure (e) illustrates an interpolation calculation of the pixel value in sampling coordinates.
Figure 3B:
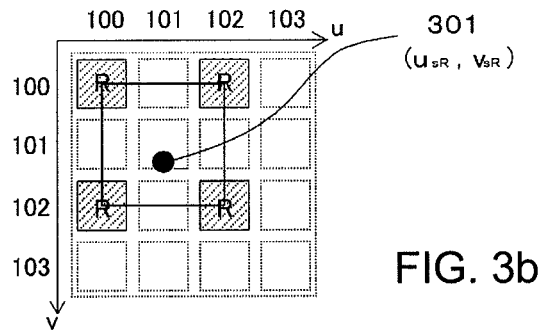
FIG. 3 is a functional description figure of a color plane decomposition unit and a color generation unit in the first embodiment.
Figure 3C:
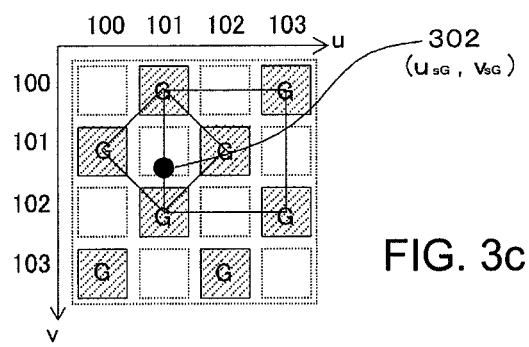
Figure 3D:
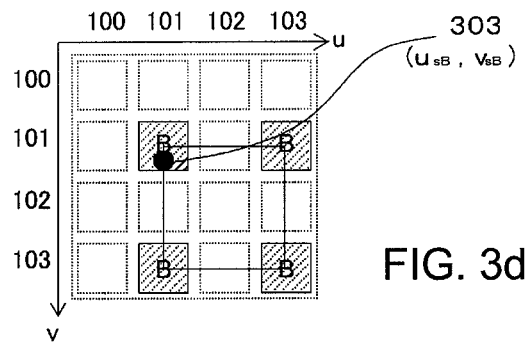
Figure 3E:
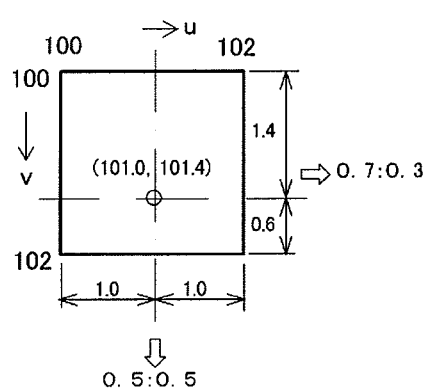

Next, as expressed to FIG. 3(e), the ratio of the distance between the owner value pixels which counter via sampling coordinates is calculated (here, the ratio in the x direction is 0.5:0.5, and the ratio in the y direction is 0.7:0.3). The pixel value of R in the sampling position (101.0,101.4) is then computed with interpolation using the pixel value of the four neighbor pixels in the same colorplane.

The pixel value of the four neighbor pixels in the same color plane are denoted as R (100,100), R (100,102), R (102,100) and R (102,102) and the pixel value of R in the sampling position (101.0,101.4) is expressed with R (101.0, 101.4). The pixel value R of the sampling coordinates 301 on R plane (101.0,101.4) is computable as follows:

$$R(101.0,101.4) = 0.5*0.3*R(100,100) + 0.5*0.7*R(100,102) + 0.5*0.3*R(102,100) + 0.5*0.7*R(102,102)$$

The pixel value of B in the sampling coordinates 303 on B plane is computable with interpolation from the pixel value of four neighbor pixels surrounding sampling coordinates in the same color plane analogous to the computation shown above for the R plane.

In the G plane, the neighbouring pixels having the same color are arranged in a checkerboard pattern as shown in FIG. 3(c). The four owner value pixels surrounding the sampling coordinates are arranged at a square having sides with a length of $\sqrt{2}$ and inclined at an angle of 45-degrees.

In this case, if the sampling coordinates 302 are (101.0, 101.4) in the G plane the coordinates (u, v) of the four neighbor pixels surrounding are (100,101), (101,100), (101,102), and (102,101).

If the pixel value of the neighbor pixels in the G plane are expressed with G (100,101), G (101,100), G (101,102), and G (102,101) the pixel value G of the sampling coordinates 302 on G plane (101.0,101.4) are computable as follows:

$$G(101.0,101.4) = 0.5*0.3*G(100,101) + 0.5*0.7*G(101,100) + 0.5*0.3*G(101,102) + 0.5*0.7*G(102,101)$$

Next, the sampling values R ($u_s$, $v_s$), G ($u_s$, $v_s$), and B ($u_s$, $v_s$) generated by the sampling unit 32 are provided to the color generation unit 33, combined therein as color information for the pixel ($u_d$, $v_d$) of a color picture, and subsequently provided to the vision correction unit 34.

The vision correction unit 34 performs picture corrections to the color picture obtained from the color generation unit 33, such as tone curve (gamma) amendment for improving appearance, chroma saturation emphasis, and edge enhancement. In the compression unit 35, the digital image signal of the color picture outputted via the vision correction unit is compressed by methods, such as JPEG (Joint Photographic Experts Group), to reduce the size of the image data to be stored. Subsequently, the recording unit 36 memorizes the compressed digital image signal to a recording medium, such as a flash memory. The compressed digital image signal may then be transmitted by an operator to an external device via an interface (not shown).

In order to control the false color contained in this image data is generated by the color generation unit 33 the RGB color information of RGB may be converted into a YUV system chrominance signal. Subsequently a lowpass filter may applied to UV, and the resulting signal may be provided to the vision correction unit 34. Therein Y is the luminosity, U is difference between the component blue (B) and the luminosity (Y) and V is the difference between and the component red (R) and the luminosity Y.

$$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix} \quad (1)$$

Next, with reference to FIG. 5 a procedure for compensating a aberration distortion based on a mosaic image (input image) obtained via the imaging optical system 2, and for generating a color picture (output image) is explained.

Based on a program stored in ROM 19, CPU 18 controls each functional unit of the image processing device shown in FIG. 1, and performs this procedure.

The procedure begins when a start signal is input into the image processing device 100 by an operator.

Subsequently, in S110, a picture signal is read from the imaging optical system 2 into the image processing device 100. In step S120 Bayer array mapping is done by the color plane decomposition unit 21, and the R pixel signal, the G pixel signal, and the B pixel are memorized. Subsequently the procedure continues with sampling step S170.

The output image is divided into a plurality of triangles, and these triangles are scanned in S130, using the block scanning unit 25. Blocks vertexes (for example, P1 P2, P3 as shown in FIG. 2a) with coordinates $(u_{dn}, v_{dn})=[(u_{d1}, v_{d1}), (u_{d2}, v_{d2}), (u_{d3}, v_{d3})]$ are acquired. In the present embodiment, the block shape and the block count, or vertex coordinates of each block are provided beforehand, dependent on a size of the imaging optical system 2 and the output color image, and are stored in ROM 19. Control flow then continues with S140.

Subsequently, in S140, using the vertex sampling-coordinates operation section 30, sampling coordinates $(u_{sn}, v_{sn})$ in a color mosaic image (input image) corresponding to three triangular vertices are computed for compensation of influences of a distortion by aberration. Control flow then continues to S150.

Subsequently, in S150, using the pixel scanning section 28, a triangle is rasterized, a pixel in block is scanned the coordinates are acquired. Control flow the continues to S160.

Subsequently, in S160, the sampling-coordinates interpolating calculation section 31 is used to calculate by interpolation the sampling coordinates $(u_s, v_s)$ of a pixel in an input image corresponding to a pixel $(u_d, v_d)$ in the block based on the three vertex sampling coordinates $(u_{sn}, v_{sn})$ surrounding this pixel. Control flow then continues with S170.

Subsequently, in S170, using the sampling unit 32 from each color plane generated by the color plane decomposition unit 21 a sampling value (i.e. a pixel value for a particular color in a sampling position) is determined for every R, G and B in sampling coordinates $(u_{sn}, v_{sn})$, which were computed by the sampling-coordinates generating unit 29, G, and B is computed, and control flow subsequently continues with S180.

Subsequently, in S180, by composing a sampling value of each color computed by the sampling unit 32 using the color generation unit 33, color information of a plural color is generated for each pixel, respectively, and control flow subsequently continues to S190.

Subsequently, in S190, it is determined whether a next pixel is present within the block. If the block comprises no further pixels (No) control flow continues to S200, and if the block comprises a further pixel (Yes) steps S150-S190 are repeated.

Subsequently it is determined whether a next block is present in the output image. If it is determined that no further blocks are present program flow continues with step S210. If is determined that a next block is present steps S130-S200 are repeated. A scanning order is determined beforehand and stored in ROM 19 when the output image comprises a plurality of blocks.

In step S210, using the vision correction unit 34 picture corrections are applied to a color picture generated by the color generation unit 33 Such corrections may be tone curve (gamma) amendment, chroma saturation emphasis, and edge enhancement. Program flow theb continues with step S220.

Subsequently, in S220, a digital image signal of a color picture outputted via the vision correction unit is compressed by methods, such as JPEG (Joint Photographic Experts Group), using the compression unit 35 to reduce the amount of image data stored. Program flow then continues with step S230.

Subsequently, in S230, the compressed digital image signal is memorized to a recording medium, such as a flash memory, using the recording unit 36. after which the image processing program is ended.

As set out above, according to the image processing device 100, the image processing method, and the image processing program given in a first embodiment only the sampling points for pixels coinciding with the vertices of the blocks need to be calculated with a high order polynomial. The other sampling points are calculated by interpolation. In this way distortion correction is possible with a relatively small number of high order polynomial operations so that memory space and processing time requirements can be reduced.

The high order polynomial or its coefficients used for calculation of vertex sampling coordinates in the vertex sampling-coordinates operation section 30 is related to the imaging optical system 2 formed by the imaging lens 3 which accompanies the image sensor 5. In this way a aberration distortion of an image formation optical system can be compensated, and a predetermined output image with sufficient accuracy can be obtained.

Figure 6:
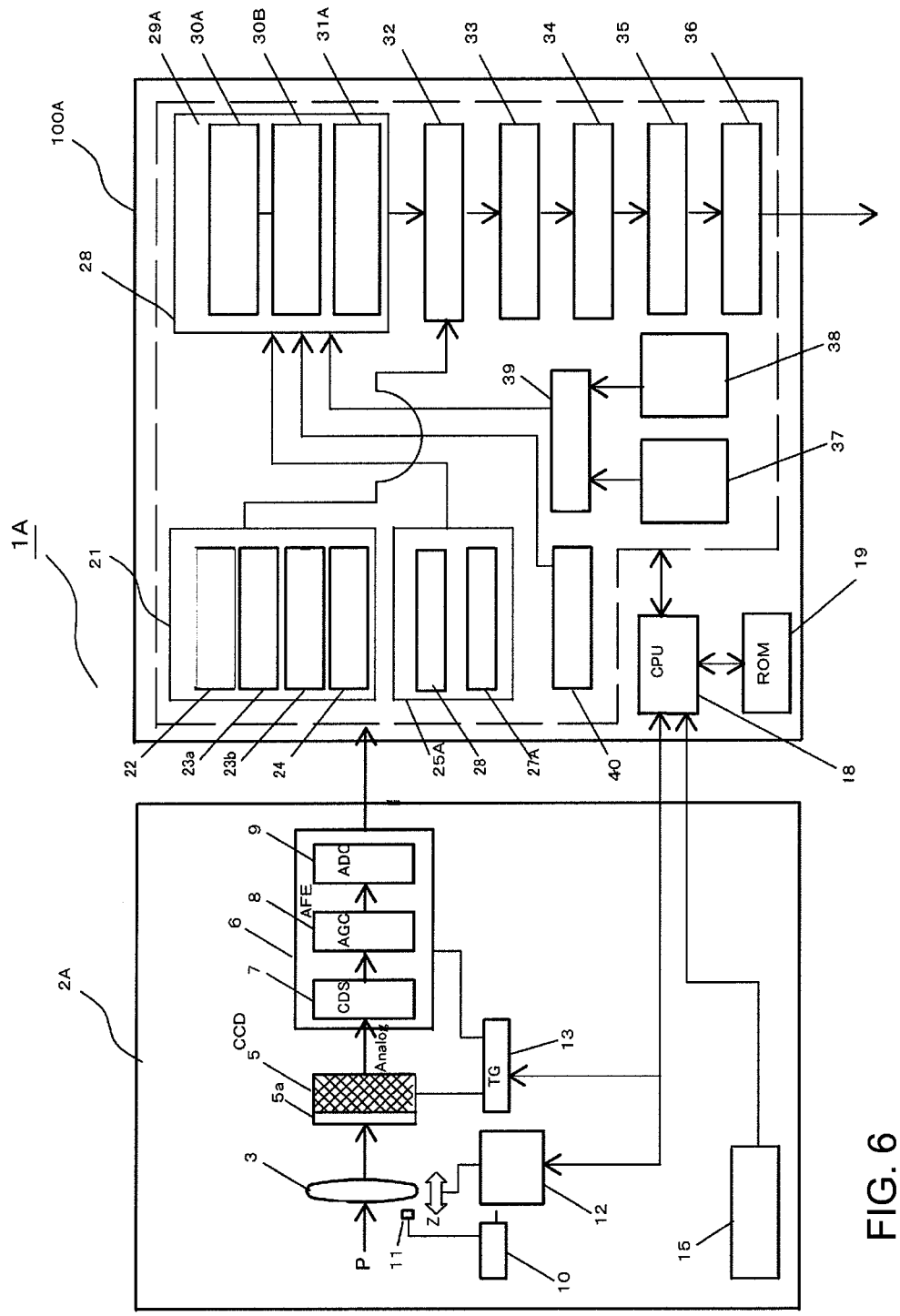
FIG. 6 is a block diagram of the imaging device in a second embodiment of the present invention.

(A second embodiment) Next, the second embodiment of the present invention is described with reference to FIG. 6-FIG. 10. FIG. 6 is a block diagram showing a composition of the imaging device 1A of one example to which an image processing device of this invention and an image processing method, and an image processing program were applied.

Figures 7, 8:
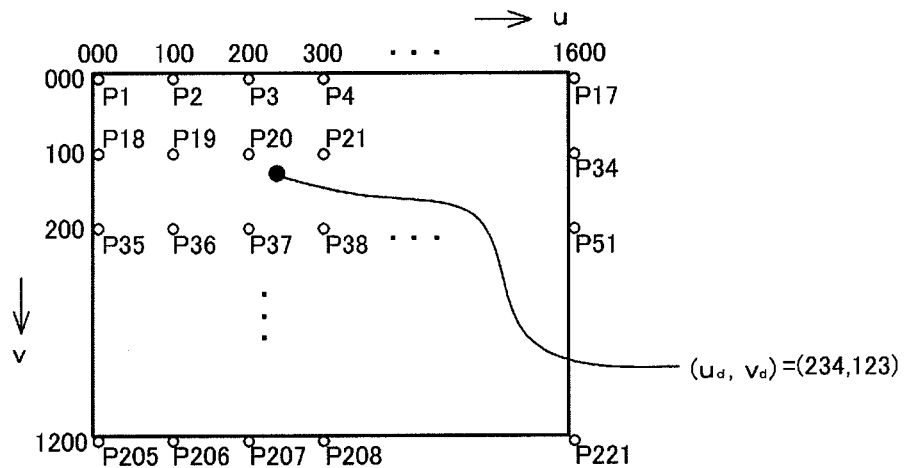
FIG. 7 shows an arrangement of vertex-coordinates in an output image in an image processing procedure according to the second embodiment, and an explanatory view of uv coordinate system.
FIG. 8 shows an example of a look-up table set for storing aberration coefficients in the image processing device according to the second embodiment, FIG. 9 functionally illustrates color plane decomposition unit and a color generation unit in the second embodiment. Therein FIG. 9(a) expresses the color mosaic image of the Bayer array outputted by the imaging optical system 2, and FIGS. 9(b), (c), (d), and (e) are the R plane, the Gr plane, the Gb plane, and the B plane arrangement respectively generated by the color plane decomposition unit.

FIG. 7 shows the generation of uv vertex-coordinates in the output image in the second embodiment and an explanatory view of, and FIG. 8 shows an example of a lookup table comprising aberration coefficients used for image processing in this example.

Figure 9:
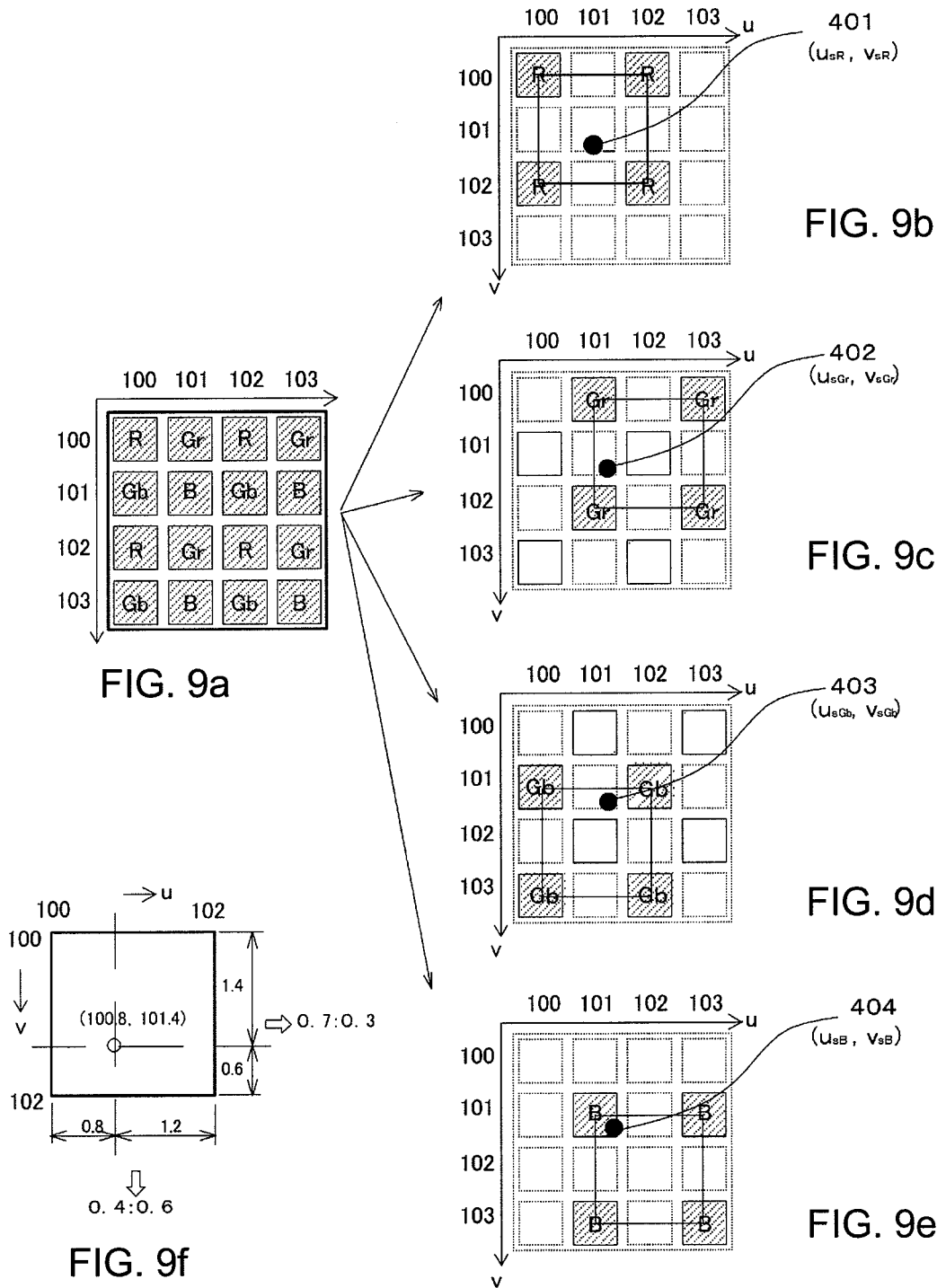
FIG. 9(f) illustrates an interpolation calculation of the pixel value in sampling coordinates.

FIG. 9 illustrates operation of a color plane decomposition unit and a color generation unit in the second embodiment. FIG. 9(a) shows a color mosaic image of a Bayer array outputted by the imaging optical system 2. FIGS. 9(b), (c), (d), and (e) respectively show the R plane, the Gr plane, the Gb plane, and the B plane as generated by the color plane decomposition unit, respectively and Figure (f) shows carrying out interpolation calculation of the pixel value in sampling coordinates.

Figure 10:
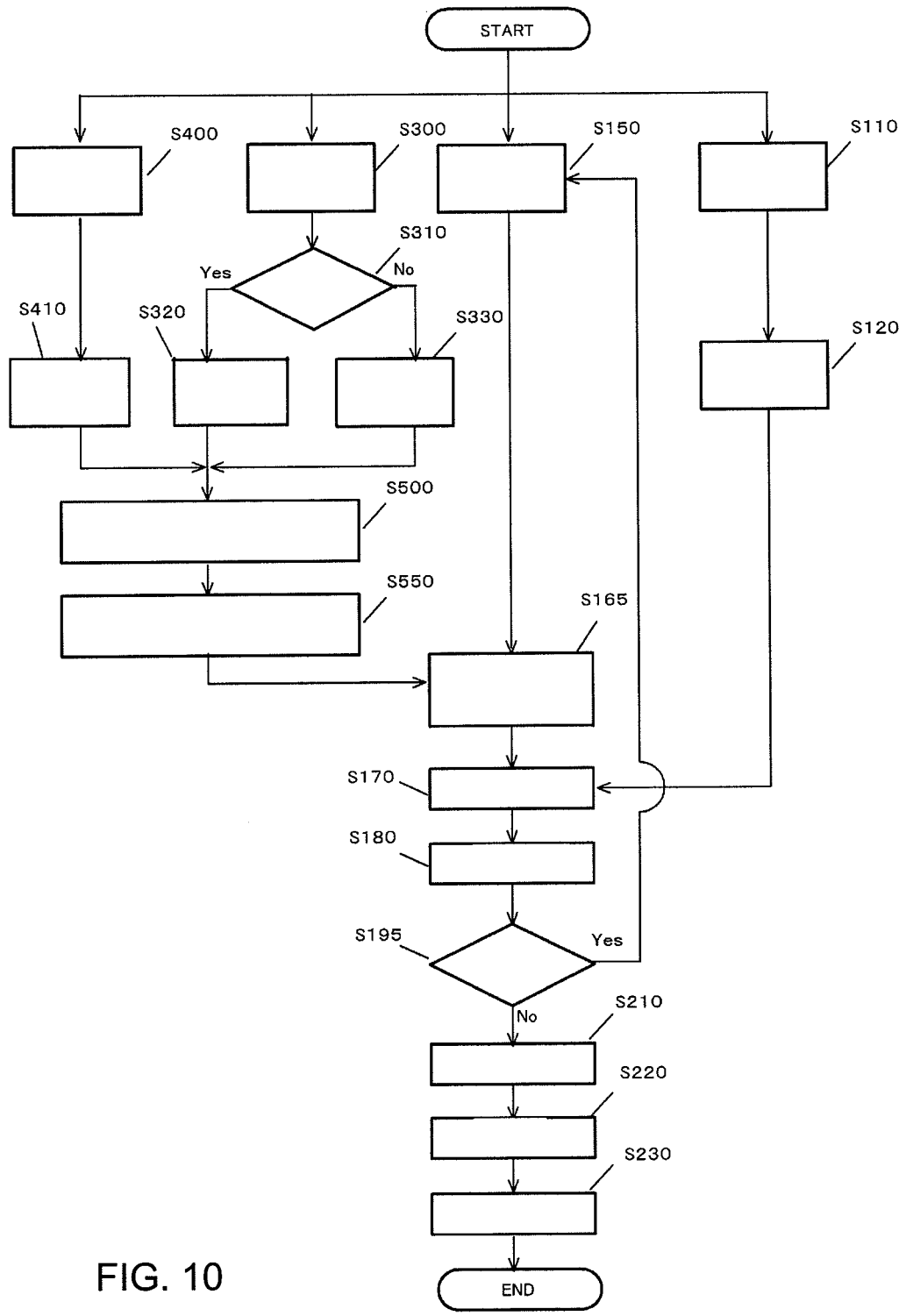
FIG. 10 shows an image processing program used in the second embodiment.

FIG. 10 is a figure showing an image processing procedure in an image processing program in this embodiment.

Parts of the imaging device 1A in this second embodiment that correspond to those of imaging device 1 according to the first embodiment have the same reference numerals. A detailed description is omitted for those aspects that are similar to the first embodiment, but the differences are described below.

A lens actuator 12 allows the imaging lens 3 to slide according to an optical axis direction Therewith a lens state, such as a focal distance of the imaging lens 3 comprised in the imaging optical system 2A, and object distance from the imaging lens 3 to a photographic subject is allowed to be variable.

As illustrated in FIG. 6, the imaging device 1A detects blur in the imaging optical system 2A. To that end it has an angular velocity sensor (for example a gyroscope) 15 which outputs an electrical signal (henceforth also denoted as the blur signal) according to the amount of blur. In this embodiment the image processing device 100A is equipped with a blur primary detecting element 40 which detects an amount of blur of the imaging device 1A via the angular velocity sensor 15.

An input image (mosaic image) obtained by the image processing device 100A from the imaging optical system 2A is separated in the R, Gr, Gb, and B by color plane decomposition unit 21 and memorized for every pixel. The output image scanning unit 25A scans pixel coordinate and vertex coordinates in the output image. The image processing device 100A further has a lens state primary detecting element 37 which detects the lens state of the imaging lenses 3, such as a focal distance and distance with a photographic subject, and the imaging lens 3. The image processing device 100A further has an aberration coefficient memory table 38, and an aberration coefficient generation unit 39 which generates a parameter (henceforth a aberration distortion coefficient) of a aberration distortion based on information from the aberration coefficient storage unit 38 and an output of the lens state primary detecting element 37 in an output image range. A plurality of vertex coordinates is generated. A sampling-coordinates generating unit 29A etc. generates a sampling position in an input image for every pixel coordinate in the output image provided by scanning unit 25A.

Matched with a Bayer array is a color plane decomposition unit 21 as illustrated in FIG. 6 and FIG. 9 that has an R field memory 22 for memorizing an R pixel signal a Gr field memory 23a for memorizing a Gr pixel signal (R which neighbors R in a particular direction), a Gb field memory 23b for memorizing a Gb pixel signal (R which neighbors B in said particular direction). Likewise, the B field memory 24 memorizes a B pixel signal. These pixel signals (henceforth also denoted as pixel value) are outputted to the sampling unit 32 based on instructions from CPU 18.

The aberration coefficient generation unit 39 reads a suitable aberration parameter (k in the below-mentioned computing formula) $k_1$, $k_2$, $p_1$, $p_2$, $k_r$, $d_{Rx}$, $k_B$, $d_{Bx}$, $d_{By}$, etc. from the aberration coefficient memory table 38 in response to the lens state, and it outputs this to the vertex sampling-coordinates operation section 30A. In case a particular lens state is not memorized by the aberration coefficient memory table 38, then an aberration parameter is generated by interpolation from similar lens states, and.

As it is difficult for the aberration coefficient table 38 to memorize an aberration coefficient for each lens state and, it memorizes an aberration coefficient for predetermined lens states as shown in FIG. 8. In this example the table stores an aberration coefficient for three object distances including Near (short distance): 0.5 m, Mid (owner distance): 1.0 m, and Far (long distance):Inf, and for the focal distances Wide: 28 mm, Mid: 50 mm, Tele: 105 mm for every object distance. The aberration coefficient memory table 38 serves as a facility to memorize a coefficient of a high order polynomial in the present invention.

By way of example, an aberration coefficient for a focal distance is 35 mm and an object distance of 2.0 m, which is not memorized by the number difference coefficient memory table 38 shown in FIG. 8 is interpolated from aberration coefficients memorized by the aberration coefficient memory table 38 for other lens states.

In this example the aberration coefficient is 0.08 for the lens state having the setting of 1.0 m for the object distance (Mid) and 28 mm for the focal distance (Wide). The aberration coefficient is 0.05 for the lens state having the setting infinite for the object distance (Far) and 28 mm for the focal distance (Wide). The aberration coefficient is 0.00 for the lens state having the setting infinite for the object distance (Far) and 50 mm for the focal distance (Mid) and the aberration coefficient is 0.02 for the lens state having the setting of 1.0 m for the object distance (Mid) and 50 mm for the focal distance (Mid). The aberration coefficient generation unit 39 serves as high order polynomial modification facility in this embodiment of the invention.

In this example the aberration coefficient $k_1$=when for the lens state with a focal distance of 35 mm and an object distance of 2.0 m is calculated as follows.

$$k_1 = \frac{0.08 * \left(\frac{1}{2.0} - \frac{1}{Inf}\right)\left(\frac{1}{35} - \frac{1}{50}\right) + 0.05 * \left(\frac{1}{1.0} - \frac{1}{2.0}\right)\left(\frac{1}{35} - \frac{1}{50}\right) + 0.02 * \left(\frac{1}{2.0} - \frac{1}{Inf}\right)\left(\frac{1}{28} - \frac{1}{35}\right) + 0.00 * \left(\frac{1}{1.0} - \frac{1}{2.0}\right)\left(\frac{1}{28} - \frac{1}{35}\right)}{\left(\frac{1}{1.0} - \frac{1}{Inf}\right)\left(\frac{1}{28} - \frac{1}{50}\right)}$$

Accordingly $k_1$=0.04

Similarly other aberration coefficients $k_2$, $p_1$, $p_2$, $k_R$, and $k_B$ can be calculated by interpolation from data stored in the aberration coefficient memory table 38.

The blur primary detecting element 40 detects blur in the imaging optical system, and outputs blur correction parameters z, θ, dx, dy, etc. for compensating blur to the vertex sampling-coordinates operation section 30A.

Therein z is the correction value for the size of an object image on the blur correction parameter and accompanying blur in a radial direction of the imaging device 1A. θ is the correction value for a rotation of an object image accompanying blur of roll axes. Furthermore, dx is the correction value of a horizontal position of an object image accompanying blur of a longitudinal direction or a yaw axis, and dy is the correction value of a horizontal position of an object image accompanying blur of a sliding direction or a pitch axis.

An adjusted value depending on zoom magnifying power of the imaging device 1A may be included in the blur correction parameter z. Alternatively the vertex sampling-coordinates operation section 30A may use an affine transformation M that represents the blur correction parameters.

The output image scanning unit 25A comprises a vertex-coordinates generating section 27A which generates a plurality of vertex coordinates arranged discretely in the output image, and the pixel scanning section 28 which scans the pixel positions between the vertices.

The vertex-coordinates generating section 27A generates coordinates $(u_d, v_d)_{Pj}$ of a plurality of vertices Pj arranged at an output image. Next, a method of calculating vertex sampling coordinates is described in more detail.

First, vertex coordinates (P1, P2, P3, - - -, Pn) in an output image are generated beforehand as shown in FIG. 7. Therein a plurality of vertex coordinates is discretely arranged on an output image. By increasing the number of vertex coordinates, so that they are densely arranged the distortion correction accuracy of distortion will improve, but the computational complexity of the compensation increases. If the number of vertex coordinates is reduced, and the arrangement of vertex coordinates is more course, the operational load of the distortion compensation compensation will decrease, but the accuracy of the compensation decreases.

According to investigations carried out by the inventor the number of the vertices is preferably in a range of about 100 to 1000 taking into account compensation accuracy and computational complexity. It is preferred that a plurality of vertex coordinates are regularly arranged as expressed, for example to FIG. 7.

By way of example, when an output image comprises pixel arrangement of 1600×1200 pixels the vertexes may be arranged in a grid having regular intervals of 100 pixels in both directions. I.e. the vertex-coordinates are $(u_d, v_d)_{Pj}$=[(0, 0) (100, 0) - - - (1600-1200) - - - ], comprising 17×13=221 points. The vertexes may be consecutively numbered with index j (1, 2, . . . , –221).

Next, the vertex sampling-coordinates operation section 30A computes a sampling position in the input image corresponding to the vertex generated by the output image scanning unit 25A. The vertex sampling-coordinates memory table 30B memorizes a vertex sampling position computed by the vertex sampling-coordinates operation section 30A. Vertex sampling positions computed by the vertex sampling-coordinates operation section 30A are provided to the sampling-coordinates interpolating calculation section 31A etc. which carries out interpolation calculation of the sampling position of an input image corresponding to each pixel position of an output image.

Next calculation of a vertex sampling-coordinates position in the vertex sampling-coordinates operation section 30A is described in more detail.

First, a coordinate system matched with a pixel position is expressed with a uv coordinate system as described with reference to the first embodiment, the greatest image height is normalized to 1 and wherein the image center is defined as the origin. Subscripts s and d respectively are used for coordinates in the input image and for coordinates in the output image (color picture).

In an output image, 1200×1600 pixels are arranged at equal intervals in a sliding direction and a longitudinal direction respectively. As shown in FIG. 7, in a rightward from the upper left pixel coordinates $(u_d, v_d)$ are numbered as (0, 0), (1, 0), - - - (2, 0). Pixels in the following line are assigned with (0, 1), (1, 1), and - - - (2, 1). Next xy coordinates $(x_d, y_d)$ of a pixel coordinate $(u_d, v_d)$ are computed by formula 2 presented below. Next, blur correction parameter z, θ, dx, and dy are applied, and coordinates (x', y') after the blur compensation are computed by formula 3.

[Formula 2]

$$\begin{pmatrix} x_d \\ y_d \end{pmatrix} = \begin{pmatrix} 0.001 & 0 & -0.7995 \\ 0 & 0.001 & -0.5995 \end{pmatrix} \begin{pmatrix} u_d \\ v_d \\ 1 \end{pmatrix} \quad (2)$$

$$\begin{pmatrix} x' \\ y' \end{pmatrix} = \begin{pmatrix} z\cos\theta & z\sin\theta & dx \\ -a\sin\theta & z\cos\theta & dy \end{pmatrix} \begin{pmatrix} x_d \\ y_d \\ 1 \end{pmatrix} \quad (3)$$

$$\begin{pmatrix} wx' \\ wy' \\ wz' \end{pmatrix} = M \begin{pmatrix} x_d \\ y_d \\ 1 \end{pmatrix} \quad (4)$$

If in this embodiment the blur correction parameter is applied by an affine transformation M, formula 3 is replaced by formula 4. Subsequently the coordinates x', y' can be computed as x'=wx'/w and y'=wy'/w.

To compensate blur, sampling-coordinates $x_{sG}$, $y_{sG}$ in the G plane, provided by the color plane decomposition unit 21, are calculated as follows, using the aberration distortion compensation coefficients $k_1$, $k_2$, $p_1$, and $p_2$ $x_{sG} = x'(1 + k_1 r'^2 + k_2 r'^4 + 2p_1 x'y' + p_2(r'^2 + 2x'^2))$, and $y_{sG} = y'(1 + k_1 r'^2 + k_2 r'^4) + 2p_2 x'y' + p_1(r'^2 + 2y'^2)$.

Furthermore, in this embodiment $r'^2 = x'^2 + y'^2$.

$k_1$, $k_2$, $p_1$, and $p_2$ are coefficients indicative for a aberration distortion of the imaging optical system 2A. $k_1$ and $k_2$ are indicative for distortion in a radial direction, and $p_1$, and $p_2$ are indicative for distortion in a tangential direction.

Considering a chromatic aberration of the imaging optical system 2A, sampling coordinates $(x_{sR}, y_{sR})$ $(x_{sB}, y_{sB})$ in the R plane and the B plane are computed by formula 5 and formula 6.

$$\begin{pmatrix} x_{sR} \\ y_{sR} \end{pmatrix} = \begin{pmatrix} k_R & 0 & d_{Rx} \\ 0 & k_R & d_{Ry} \end{pmatrix} \begin{pmatrix} x_{sG} \\ y_{sG} \\ 1 \end{pmatrix} \quad (5)$$

$$\begin{pmatrix} x_{sB} \\ y_{sB} \end{pmatrix} = \begin{pmatrix} k_B & 0 & d_{Rx} \\ 0 & k_B & d_{Ry} \end{pmatrix} \begin{pmatrix} x_{sG} \\ y_{sG} \\ 1 \end{pmatrix} \quad (6)$$

$k_R$, $d_{Rx}$, $d_{Ry}$, $k_B$, $d_{Bx}$ and $d_{By}$ are coefficients indicative for a color aberration of the imaging optical system 2A.

$k_R$ and $k_B$ are the ratios between the magnification of the R and the B plane, and the magnification of the G plane respectively, $d_{Rx}$, and $d_{Ry}$, represent the shift of the R plane relative to the G plane in the x-direction and the y-direction respectively, $d_{Bx}$, and $d_{By}$, represent the shift of the B plane relative to the G plane in the x-direction and the y-direction respectively.

Suppose that the input image (color mosaic image) is also a pixel arrangement of 1600×1200 pixels and that pixel number $(u_s, v_s)$ is assigned like the output image (color picture) as a function of the coordinates $(x_{sR}, y_{sR})$, $(x_{sG}, y_{sG})$ $(x_{sB}, y_{sB})$. Then the corresponding sampling coordinates $(u_{sR}, v_{sR})$ $(u_{sG}, v_{sG})$, and $(u_{sB}, v_{sB})$ in the input image are computed by the formulas 7, 8 and 9.

[Formula 4]

$$\begin{pmatrix} u_{sR} \\ v_{sR} \end{pmatrix} = \begin{pmatrix} 1000 & 0 & 799.5 \\ 0 & 1000 & 599.5 \end{pmatrix} \begin{pmatrix} x_{sR} \\ y_{sR} \\ 1 \end{pmatrix} \quad (7)$$

$$\begin{pmatrix} u_{sG} \\ v_{sG} \end{pmatrix} = \begin{pmatrix} 1000 & 0 & 799.5 \\ 0 & 1000 & 599.5 \end{pmatrix} \begin{pmatrix} x_{sG} \\ y_{sG} \\ 1 \end{pmatrix} \quad (8)$$

$$\begin{pmatrix} u_{sB} \\ v_{sB} \end{pmatrix} = \begin{pmatrix} 1000 & 0 & 799.5 \\ 0 & 1000 & 599.5 \end{pmatrix} \begin{pmatrix} x_{sB} \\ y_{sB} \\ 1 \end{pmatrix} \quad (9)$$

The vertex sampling-coordinates operation section 30A, computes sampling-coordinates of each vertex, $(u_{sR}, v_{sR})_{Pj}$ $(U_{sG}, v_{sG})_{Pj}$ and $(u_{sB}, v_{sB})_{Pj}$ with formulas 7, 8 and 9, and stores these vertex sampling coordinates in the vertex sampling-coordinates memory table 30B. Generally the computed values of the vertex sampling coordinates will be nonintegral.

Next, the sampling-coordinates interpolating calculation section 31A computes the sampling coordinates in the input image (color mosaic image) corresponding to each pixel position in the output image (color picture).

First, a plurality of vertexes surrounding output pixels to be processed are extracted. For example, if the coordinates of an output pixel are $(u_d, v_d)_T = (234,123)$ then the surrounding vertexes (See FIG. 7) are P20, P21, P37, and P38. The coordinates thereof are $(u_d, v_d)_{P20}=(200,100)$.), $(u_d, v_d)_{P21}=(300,100)$, $(u_d, v_d)_{P37}=(200,200)$, $(u_d, v_d)_{P38}=(300,200)$). The corresponding vertex sampling-coordinates $(u_{sR}, v_{sR})_{Pi}$, $(u_{sG}, v_{sG})_{Pi}$ and $(u_{sB}, v_{sB})_{Pi}$ (Pi=20, 21, 37, 38) are read from the vertex sampling-coordinates memory table 30B. Then sampling position on the input image corresponding to the output pixels, $(u_{sR}, v_{sR})_T$, $(u_{sG}, v_{sG})_T$, and $(u_{sB}, v_{sB})_T$ are computed by line (bilinear interpolation).

I.e., sampling-coordinates $(u_{sR}, v_{sR})_T$ of R are computed by the following formula.

$$(u_{sR}, v_{sR})_t = 0.66*0.77*(u_{sR}, v_{sR})_{P20} + 0.34*0.77(u_{sR}, v_{sR})_{P21} + 0.66*0.23(u_{sR}, v_{sR})_{P37} + 0.34*0.23(u_{sR}, v_{sR})_{P38}$$

Sampling-coordinates $(u_{sG}, v_{sG})_T$ of G are computed with the formula $$(u_{sG}, v_{sG})_t = 0.66*0.77*(u_{sG}, v_{sG})_{P20} + 0.34*0.77(u_{sG}, v_{sG})_{P21} + 0.66*0.23(u_{sG}, v_{sG})_{P37} + 0.34*0.23(u_{sG}, v_{sG})_{P38}$$

Sampling-coordinates $(u_{sB}, v_{sB})_T$ of B are computed with the formula.

$$(u_{sB}, v_{sB})_t = 0.66*0.77*(u_{sB}, v_{sB})_{P20} + 0.34*0.77(u_{sB}, v_{sB})_{P21} + 0.66*0.23(u_{sB}, v_{sB})_{P37} + 0.34*0.23(u_{sB}, v_{sB})_{P38}$$

Sampling coordinates computed with these interpolations as well as vertex sampling coordinates generally are nonintegral.

Next, it is described with reference to FIG. 9, how the sampling unit 32 computes and outputs a sampling value in sampling coordinates for each color plane (R-plane, Gr-plane, Gb-plane, B-plane). As indicated above, the color planes are provided by the color plane decomposition unit 21, and the sampling-coordinates are calculated by interpolating calculation section 31A.

A sampling value Rs is obtained from R-plane at coordinate $(u_{sR}, v_{sR})_T$. Sampling values Grs, Gbs is obtained from the Gr plane, and from the Gb plane at coordinates $(u_{sGr}, v_{sGr})_T$ and $(u_{sGb}, v_{sGb})_T$ respectively. A sampling value Bs is obtained from the B-plane at $(u_{sB}, v_{sB})_T$. The sampling values Rs, Grs, Gbs, Bs are outputted for the processing-object pixel $T(u_d, v_d)$ in the output image (color picture).

As mentioned above, the computed coordinates for the sampling position are not necessarily integer coordinates. Accordingly the sampling value for sampling position $(u_s, v_s)_T$ is computed by performing linear interpolation using four pixels surrounding $(u_s, v_s)_T$.

Since the R-plane, the Gr-plane, the Gb-plane, and the B-plane of B-plane each have four neighbor pixels that surrounde the sampling coordinates 401, 402, 403, and 404 as shown in FIG. 9. For the sampling-coordinates $(u_{sR}, v_{sR})$ (100.8,101.4), the four surrounding pixels (u, v) are (100, 100), (100,102), (102,100), and (102,102).

Next, a ratio of distance is determined for neighboring pixels arranged mutually opposite the sampling coordinates as shown in FIG. 9(e). In this example the ratio in the x-direction is 0.4:0.7 and in the ratio in the y direction is 0.7:0.3. Subsequently a pixel value for the R-plane in sampling position (101.8,101.4) is computed with interpolation using a pixel value of four neighbor pixels as follows.

For example, a pixel value for the pixel with sampling position (108.0,101.4) having the four neighbor pixels R (100,100), (100,102), R (102,100), and R (102,102) is calculated as follows.

$$R(100.8,101.4) = 0.6*0.3*R(100,100) + 0.6*0.7*R(100,102) + 0.4*0.3*R(102,100) + 0.4*0.7*R(102,102)$$

Similarly, a pixel value at the sampling coordinates 402, 403, and 404 in Gr, Gb, and B plane respectively is also computable with interpolation from a pixel value of four associated pixels surrounding the sampling coordinates, as was shown for the R-plane. In the sampling unit, a sampling value of R, Gr, Gb, and B is computed for all pixels in the output image.

As a result of the color aberration correction process below the sampling value $Rs=R(u_{sR},v_{sR})$ of R, the sampling value $Grs=G_r(u_{sG}, v_{sG})$ of Gr the sampling value $Gbs=Gb(u_s,v_s)$ of Gb, and the sampling value $Bs=B(u_{sB}, v_{sB})$ of B represent the same point of the photographic subject, so that influences of chromatic aberration is inhibited.

Next, the color generation unit 33 generates color information (RGB component) for every pixel from the sampling values Rs, Grs, Gbs, and Bs for every color plane obtained by the sampling unit 32, and generates an output image (color picture).

Under the present circumstances, for example, Rs can be used for the R component of color information and Bs for the B component and an average of Grs and Gbs for the G-component.

A further false color control may be performed at this step. It is noted that false red and a blue false color may easily appear in a monochrome striped pattern near the Nyquist rate. These striped patterns can be detected by detecting a difference of Gr and Gb in a color image sensor of a Bayer array constituted by the image sensor 5, and can be used for controlling false color.

In detail, first a sum S and a difference C of a sampling value are computed by S=Rs+Bs and C=Rs−Bs for R and B, and. Then a difference K of Grs and Gbs is computed by K=Grs−Gbs. The absolute value of K is subtracted from the absolute value of C to generate C' as follows. C'=sign(C) max (0, |C|−|K|)

The R and B component in the color picture then can be computed by R=(S+C')/2, and B=(S−C'), from the computed values of C' and S.

As in the first embodiment, a vision correction unit 34 may be present, for applying picture enhancements, such as tone curve (gamma) amendment, chroma saturation emphasis and edge enhancement. A compression unit 35, may compress a digital image signal of a color picture, by methods, such as JPEG (Joint Photographic Experts Group). A recording unit 36 may memorize the compressed digital image signal to a recording medium.

Next, with reference to FIG. 10 a procedure for compensating a distortion caused by aberration in a mosaic image (input image) obtained from the imaging optical system 2A, and for generating a color picture (output image) is explained. Based on a program stored in ROM 19, CPU 18 gives a command signal to each functional unit, and therewith performs this procedure.

First, this procedure is started by a control signal to the image processing device 100A from an operator.

Subsequently, in S110, read a picture signal into the image processing device 100 via the imaging optical system 2. In step S120 Bayer array mapping is done by the color plane decomposition unit 21 and the R pixel signal, the Gr pixel signal, the Gb pixel signal, and the B pixel signal are memorized. Subsequently the procedure continues with sampling step S170.

In step S300, the lens state is matched with a focal distance or object distance as detected using the lens state primary detecting element 37, and it moves to S310 after that.

Then in step S310 it is determined whether the lens state detected in step S300 is already memorized by the aberration coefficient memory table 38. When this is the case control flow continues with step S320 to acquire an aberration coefficient. If said lens state is not memorized control flow continues with step S330. Therein aberration coefficients according to the lens state are calculated by an interpolation using aberration coefficients obtained from memory table 38. Control flow then continues with step S500.

In step S400, the blur primary detecting element 40, using an angular velocity sensor, detects an amount of blur in the image captured by imaging device 1A. Subsequently control flow continues with step S410, wherein parameters for compensation of the detected blur are computed, and it moves to S500 after that.

Subsequently in step S500 sampling-coordinates $(u_{sR}, v_{sR})_{Pj}$, $(u_{sG}, v_{sG})_{Pj}$ and $(u_{sB}, v_{sB})_{Pj}$ of each vertex are computed with the vertex sampling-coordinates operation section 30A using an aberration coefficient of the lens state acquired in S320 or S330, and using a parameter indicative for the amount of blur detected in step S410. Subsequently control flow moves to S550, wherein the calculated vertex sampling coordinates are memorized in the sampling-coordinates memory table 30B.

In S150, the pixel scanning unit 28 is used to scan a pixel position in an output image (color picture). The coordinates of the pixel position are acquired, and control flow subsequently continues with S165.

Subsequently, in S165, sampling coordinates in the input image (color mosaic image) corresponding to each pixel position of the output image (color picture are computed using the sampling-coordinates interpolating calculation section 31A by carrying out interpolating calculation of, and it moves to S170 after that.

Subsequently, in S170, using the sampling unit 32 from each color plane generated by the color plane decomposition unit 21 a sampling value is calculated. The sample value is a pixel value for every color R, Gr, Gb, and B at the sampling coordinates $(u_s, v_s)$ computed by the sampling-coordinates generation unit 29. Control flow then moves to S180.

Subsequently, in S180, the sampling values of each color computed by the sampling unit 32 are composed by color generation unit 33, therewith calculating a plurality of color information for each pixel value, respectively, and it moves to S195 after that.

In step S195 it is determined whether a next pixel of the output image has to be processed. If it is determined that this is the case (Yes) then steps S150 to S195 are repeated. If it is determined that there are no further pixels to be processed (No) control flow continues to step S210.

In step S210 the a color picture generated by the color generation unit 33 may be subjected to various image enhancement operations such as tone curve enhancement (gamma correction), chroma saturation emphasis, and edge enhancement. The image enhancement operations are carried out with vision correction unit 34. Control flow then continues with S220.

Subsequently, in S220, a digital image signal of the color picture outputted by vision correction unit is compressed by a compression method, such as JPEG (Joint Photographic Experts Group), using the compression unit 35 to reduce the amount of data to be stored. Control flow then continues with S230.

Subsequently, in S230, the compressed digital image signal is memorized in a recording media, such as a flash memory, using the recording unit 36, and this image processing program is ended after that.

As mentioned above, in the image processing device 100A, the image processing method, and the image processing program according to the second embodiment, a coefficient for aberration distortion compensation is calculated by the aberration coefficient generation unit 39, and a parameter for blur compensation is obtained from blur primary detecting element 40. By applying both compensations in the demosaicing process, the blur compensation and aberration distortion compensation can be performed in the demosaicing process, and image processing can be simplified as compared to a process wherein these compensations are carried out independently.

In the image processing device 100A, the image processing method, and the image processing program according to the second embodiment effective false color control can be performed in the color generation unit 33 by carrying out sampling by the sampling unit in the R, Gr, Gb, and B planes instead of only the three planes RGB.

In the image processing device 100A, the image processing method, and the image processing program according to the second embodiment, the aberration distortion correction is smoothly adapted to a changing the lens state, such as occurring during zoom. Therewith artifacts are prevented and an attractive picture can be acquired.

In the image processing device 100A, the image processing method, and the image processing program according to the second embodiment a sampling-coordinates generating unit 29A is used that calculates the sampling coordinates taking into account requirements necessary to compensate both aberration distortion amendment, and blur amendment. Since the applied compensation is matched with aberration distortion, taking into account, the lens state, the computational load in the demosaicing process of sampling, color generation, etc. can be reduced. As it is not necessary to perform a aberration distortion correction and a blur correction separately the whole processing can be simplified.

In the image processing device 100A, the image processing method, and the image processing program according to the second embodiment, the computational load can be reduced since computations for aberration distortion correction and blur correction are carried out only to vertex sampling coordinates rather than performing them to all the pixels of an output image. For this reason, the computational load in the vertex sampling-coordinates operation section 30A can be reduced, so that vertex sampling-coordinates operation section 30A can be easily realized using a programmed general-purpose processor. This makes it possible to update the correction calculation process by change of software. On the other hand, the sampling-coordinates interpolating calculation section 31A for which processing is needed to all the pixels of an output image can be implemented by simple hardware logic, therewith enabling a high speed processing.

As mentioned above, although one example of this invention was described, this invention is not limited to said example and may be carried out in various ways. For example, in the imaging device 1A, the imaging optical system 2A and the image processing device 100A may be detachable from each other. In an embodiment the imaging optical system 2A may be equipped with the aberration coefficient memory table 38, the aberration coefficient generating unit 39, and blur primary detecting element 40.

The invention claimed is:

1. An image processing device for generating an output image with reduced distortion from an input image inputted with an aberration distortion obtained from an image formation optical system, the image processing device comprising:
 a high order operation section that computes a sampling position in said input image by a high order polynomial from a number of predetermined pixel positions in said output image for compensation of distortion aberration, wherein the number of predetermined pixel positions in said output image is a non-zero number that is smaller than a number for all pixel positions of said output image;
 an interpolating calculation section that carries out interpolation calculation of sampling positions in said input image for further pixel positions in said output image, other than said predetermined pixel positions in said output image, wherein the sampling position in said input image for each one of said further pixel positions in said output image is calculated by interpolation from respective sampling positions in said input image of a plurality of predetermined pixel positions in said output image near said each one of said further pixel positions in said output image;
 a sampling unit that samples a pixel value of said input image in each one of a set of sampling positions computed via said high order operation section and said interpolating calculation section; and
 a digital image output section that renders the output image with reduced distortion based upon a set of samples of pixel values from the input image at a set of sampling positions, wherein the set of sampling positions includes the sampling positions computed via said high order operation section and said interpolating calculating section.

2. The image processing device according to claim 1, wherein said interpolating calculation section is arranged for computing said sampling position by bilinear interpolation.

3. The image processing device according to claim 1, wherein said interpolating calculation section is arranged for computing said sampling position by cubic interpolation.

4. The image processing device according to claim 1, wherein said high order polynomial comprises at least a third order term.

5. The image processing device according to claim 1, wherein said image formation optical system comprises a lens that projects an object image to an image sensor, and said high order polynomial or its coefficient is related with said image formation optical system which accompanies said image sensor.

6. The image processing device according to claim 5, wherein said high order polynomial or its coefficients is adaptable to a change in state of the image formation optical system which accompanies said image sensor.

7. The image processing device according to claim 5 further comprising a high order polynomial modification facility that changes said high order polynomial or its coefficients in response to a position of said lens on an optic axis.

8. The image processing device according to claim 1, further comprising a memory facility for storing a coefficient of said high order polynomial.

9. The image processing device according to claim 8, wherein coefficients of said high order polynomial that correspond to prescribed positions of said lens are stored in said memory facility, and in positions other than said prescribed positions of said lens, the image processing device has a coefficient interpolation facility that generates a coefficient of said high order polynomial by interpolation of a coefficient of said high order polynomial stored in said memory facility.

10. An image processing method for generating an output image with reduced distortion from an input image with an aberration distortion obtained from an image formation optical system, said method comprising:
 computing, during a high order arithmetic step, a sampling position in said input image by a high order polynomial from a number of predetermined pixel positions in said output image for compensation of distortion aberration, wherein the number of predetermined pixel positions in said output image is a non-zero number that is smaller than a number for all pixel positions of said output image;
 carrying out, during an interpolating calculation step, an interpolation calculation of sampling positions in said input image for further pixel positions in said output image, other than said predetermined pixel positions in said output image, wherein the sampling position in said input image for each one of said further pixel positions in said input image is calculated by interpolation from respective sampling positions in said input image of a plurality of predetermined pixel positions in said output image near said each one of said further pixel positions in said output image;
 sampling, during a sampling step, a pixel value of said input image in each one of a set of sampling positions computed via said high order arithmetic step and said interpolating calculation step; and
 rendering the output image with reduced distortion based upon a set of samples of pixel values from the input image at a set of sampling positions, wherein the set of sampling positions includes the sampling positions computed via said high order operation section and said interpolating calculating section.

11. The image processing method according to claim 10, wherein said sampling position is computed in said interpolating calculation step by bilinear interpolation.

12. The image processing method according to claim 10, wherein said sampling position is computed in said interpolating calculation step by cubic interpolation.

13. The image processing method according to claim 10, wherein said high order polynomial comprises at least a third order term.

14. The image processing device according to claim 10, wherein said image formation optical system comprises a lens that projects an object image to an image sensor, and said high order polynomial or its coefficient is related with said image formation optical system which accompanies said image sensor.

15. The image processing method according to claim 14, wherein said high order polynomial or its coefficients is adaptable to a change in state of the image formation optical system which accompanies said image sensor.

16. The image processing method according to claim 14, wherein said high order polynomial or its coefficients are adapted in response to a position of said lens on an optic axis.

17. The image processing method according to claim 10, wherein a coefficient of said high order polynomial is stored using a memory facility.

18. The image processing method according to claim 17, wherein coefficients of said high order polynomial that correspond to prescribed positions of said lens are stored in said memory facility, and in positions other than said prescribed positions of said lens, a coefficient interpolation generation step is applied which generates a coefficient of said high order polynomial by interpolation from a coefficient of said high order polynomial stored in said memory facility.

19. A non-transitory computer-readable medium comprising an image processing program containing computer-executable instructions to be performed on a computer, which generates an output image which reduced distortion from an input image input with an aberration distortion of an image formation optical system, comprising:
computing, during a high order arithmetic step, a sampling position in said input image by a high order polynomial from a number of predetermined pixel positions in said output image for compensation of said distortion aberration, wherein the number of predetermined pixel positions in said output image is a non-zero number that is smaller than a number for all pixel positions of said output image;
carrying out, during an interpolating calculation step, an interpolation calculation of sampling positions on said input image for further pixel positions in said output image, other than said predetermined pixel positions in said output image, wherein the sampling position in said input image for each one of said further pixel positions in said input image is calculated by interpolation from respective sampling positions in said input image of a plurality of predetermined pixel positions near said each one of said further pixel positions in said output image;
sampling, during a sampling step, a pixel value of said input image in each one of a set of sampling positions computed via said high order arithmetic step and said interpolating calculation step; and
rendering the output image with reduced distortion based upon a set of samples of pixel values from the input image at a set of sampling positions, wherein the set of sampling positions includes the sampling positions computed via said high order operation section and said interpolating calculating section.

20. The non-transitory computer-readable medium according to claim 19, and wherein the computer-executable instructions instruct the computer to compute said sampling position in said interpolating calculation step by bilinear interpolation.

21. The non-transitory computer-readable medium according to claim 19, wherein the computer-executable instructions instruct the computer to compute said sampling position in said interpolating calculation step by cubic interpolation.

22. The non-transitory computer-readable medium according to claim 19, wherein said high order polynomial comprises at least a third order term.

23. The non-transitory computer-readable medium according to claim 19, wherein said image formation optical system comprises a lens that projects the object image to an image sensor, and said high order polynomial or its coefficient is related with said image formation optical system which accompanies said image sensor.

24. The non-transitory computer-readable medium according to claim 23, wherein said high order polynomial or its coefficients is adaptable to a change in state of the image formation optical system which accompanies said image sensor.

25. The non-transitory computer-readable medium according to claim 23, wherein said high order polynomial or its coefficients are adapted in response to a position of said lens on an optic axis.

26. The non-transitory computer-readable medium according to claim 19, wherein a coefficient of said high order polynomial is stored using a memory facility.

27. The non-transitory computer-readable medium according to claim 26, wherein coefficients of said high order polynomial that correspond to prescribed positions of said lens are stored in said memory facility, and wherein in positions other than said prescribed positions of said lens, a coefficient interpolation generation step is applied which generates a coefficient of said high order polynomial by interpolation from a coefficient of said high order polynomial stored in said memory facility.

* * * * *